United States Patent
Bliss et al.

(10) Patent No.: US 11,947,167 B2
(45) Date of Patent: Apr. 2, 2024

(54) FIBER OPTIC TERMINALS AND TOOLS AND METHODS FOR ADJUSTING A SPLIT RATIO OF A FIBER OPTIC TERMINAL

(71) Applicant: Corning Research & Development Corporation, Corning, NY (US)

(72) Inventors: Jody Todd Bliss, Rock Stream, NY (US); Douglas Llewellyn Butler, Painted Post, NY (US); Agnivo Gosai, Corning, NY (US); Martin Hempstead, Painted Post, NY (US); Blake Paul Lee, Corning, NY (US); William James Miller, Horseheads, NY (US); Pinhas Yehuda Rosenfelder, Beit-Shemesh (IL); Peter Gerard Wigley, Corning, NY (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 17/749,802

(22) Filed: May 20, 2022

(65) Prior Publication Data
US 2022/0381989 A1    Dec. 1, 2022

Related U.S. Application Data

(60) Provisional application No. 63/193,186, filed on May 26, 2021.

(51) Int. Cl.
*G02B 6/28*    (2006.01)
(52) U.S. Cl.
CPC .................. *G02B 6/2852* (2013.01)

(58) Field of Classification Search
CPC .............................. G02B 6/283; G02B 6/2852
See application file for complete search history.

(56) References Cited

U.S. PATENT DOCUMENTS

| | | |
|---|---|---|
| 3,792,284 A | 2/1974 | Kaelin |
| 3,912,362 A | 10/1975 | Hudson |

(Continued)

FOREIGN PATENT DOCUMENTS

| | | |
|---|---|---|
| AU | 2006232206 A1 | 10/2006 |
| CN | 1060911 A | 5/1992 |

(Continued)

OTHER PUBLICATIONS

"Variable optical power splitters create new apps", Lightwave_Mar. 1, 2005, 14 pages.

(Continued)

*Primary Examiner* — Omar R Rojas
(74) *Attorney, Agent, or Firm* — Michael E. Carroll, Jr.

(57) ABSTRACT

Fiber optic terminals, tools and methods for adjusting a split ratio of a fiber optic terminal are disclosed. In one embodiment, a tool for adjusting a split ratio of a fiber optic terminal includes an axle for insertion into a port of the fiber optic terminal, and a terminal engagement body disposed about the axle. The terminal engagement body includes a terminal engagement feature for engaging an alignment feature within the fiber optic terminal, wherein the axle is free to rotate with respect to the terminal engagement body, and a set-point indicator. The tool further includes an end piece coupled to the axle, and a plurality of set-point markers, wherein rotation of the end piece causes rotation of the axle and an alignment between one set-point marker of the plurality of set-point markers with the set-point indicator indicates the split ratio of the fiber optic terminal.

17 Claims, 14 Drawing Sheets

(56) References Cited

U.S. PATENT DOCUMENTS

| | | |
|---|---|---|
| 4,148,557 A | 4/1979 | Garvey |
| 4,167,303 A | 9/1979 | Bowen et al. |
| 4,168,109 A | 9/1979 | Dumire |
| 4,336,977 A | 6/1982 | Monaghan et al. |
| 4,373,777 A | 2/1983 | Borsuk et al. |
| 4,413,880 A | 11/1983 | Forrest et al. |
| 4,423,922 A | 1/1984 | Porter |
| 4,440,471 A | 4/1984 | Knowles |
| 4,461,537 A | 7/1984 | Raymer et al. |
| 4,547,937 A | 10/1985 | Collins |
| 4,615,581 A | 10/1986 | Morimoto |
| 4,634,858 A | 1/1987 | Gerdt et al. |
| 4,688,200 A | 8/1987 | Poorman et al. |
| 4,690,563 A | 9/1987 | Barton et al. |
| 4,711,752 A | 12/1987 | Deacon et al. |
| 4,723,827 A | 2/1988 | Shaw et al. |
| 4,741,590 A | 5/1988 | Caron |
| 4,842,363 A | 6/1989 | Margolin et al. |
| 4,844,570 A | 7/1989 | Tanabe |
| 4,877,303 A | 10/1989 | Caldwell et al. |
| 4,944,568 A | 7/1990 | Danbach et al. |
| 4,979,792 A | 12/1990 | Weber et al. |
| 5,007,860 A | 4/1991 | Robinson et al. |
| 5,011,251 A | 4/1991 | Miller et al. |
| 5,067,783 A | 11/1991 | Lampert |
| 5,073,042 A | 12/1991 | Mulholland et al. |
| 5,076,656 A | 12/1991 | Briggs et al. |
| 5,085,492 A | 2/1992 | Kelsoe et al. |
| 5,088,804 A | 2/1992 | Grinderslev |
| 5,091,990 A | 2/1992 | Leung et al. |
| 5,131,735 A | 7/1992 | Berkey et al. |
| 5,142,602 A | 8/1992 | Cabato et al. |
| 5,146,519 A | 9/1992 | Miller et al. |
| 5,155,900 A | 10/1992 | Grois et al. |
| 5,162,397 A | 11/1992 | Descamps et al. |
| 5,210,810 A | 5/1993 | Darden et al. |
| 5,212,752 A | 5/1993 | Stephenson et al. |
| 5,224,187 A | 6/1993 | Davisdon |
| 5,231,685 A | 7/1993 | Hanzawa et al. |
| 5,245,683 A | 9/1993 | Belenkiy et al. |
| 5,263,239 A | 11/1993 | Ziemek |
| 5,268,979 A | 12/1993 | Weidman |
| 5,276,750 A | 1/1994 | Manning |
| 5,317,663 A | 5/1994 | Beard et al. |
| 5,321,917 A | 6/1994 | Franklin et al. |
| 5,339,372 A | 8/1994 | Miller et al. |
| 5,375,183 A | 12/1994 | Edwards et al. |
| 5,381,494 A | 1/1995 | O'Donnell et al. |
| 5,390,269 A | 2/1995 | Palecek et al. |
| 5,408,570 A | 4/1995 | Cook et al. |
| 5,425,121 A | 6/1995 | Cooke et al. |
| 5,452,388 A | 9/1995 | Rittle et al. |
| 5,519,799 A | 5/1996 | Murakami et al. |
| 5,553,186 A | 9/1996 | Allen |
| 5,557,696 A | 9/1996 | Stein |
| 5,569,050 A | 10/1996 | Lloyd |
| 5,588,077 A | 12/1996 | Woodside |
| 5,600,747 A | 2/1997 | Yamakawa et al. |
| 5,603,631 A | 2/1997 | Kawahara et al. |
| 5,608,828 A | 3/1997 | Coutts et al. |
| 5,631,993 A | 5/1997 | Cloud et al. |
| 5,647,045 A | 7/1997 | Robinson et al. |
| 5,673,346 A | 9/1997 | Iwano et al. |
| 5,694,507 A | 12/1997 | Walles |
| 5,748,821 A | 5/1998 | Schempp et al. |
| 5,761,359 A | 6/1998 | Chudoba et al. |
| 5,781,686 A | 7/1998 | Robinson et al. |
| 5,782,892 A | 7/1998 | Castle et al. |
| 5,790,740 A | 8/1998 | Cloud et al. |
| 5,791,918 A | 8/1998 | Pierce |
| 5,796,895 A | 8/1998 | Jennings et al. |
| RE35,935 E | 10/1998 | Cabato et al. |
| 5,818,993 A | 10/1998 | Chudoba et al. |
| 5,857,050 A | 1/1999 | Jiang et al. |
| 5,862,290 A | 1/1999 | Burek et al. |
| 5,883,999 A | 3/1999 | Cloud et al. |
| 5,884,000 A | 3/1999 | Cloud et al. |
| 5,884,001 A | 3/1999 | Cloud et al. |
| 5,884,002 A | 3/1999 | Cloud et al. |
| 5,884,003 A | 3/1999 | Cloud et al. |
| 5,887,099 A | 3/1999 | Csipkes et al. |
| 5,920,669 A | 7/1999 | Knecht et al. |
| 5,925,191 A | 7/1999 | Stein et al. |
| 5,926,596 A | 7/1999 | Edwards et al. |
| 5,960,141 A | 9/1999 | Sasaki et al. |
| 5,961,344 A | 10/1999 | Rosales et al. |
| 5,971,626 A | 10/1999 | Knodell et al. |
| RE36,592 E | 2/2000 | Giebel et al. |
| 6,030,129 A | 2/2000 | Rosson |
| 6,035,084 A | 3/2000 | Haake et al. |
| 6,045,270 A | 4/2000 | Weiss et al. |
| 6,094,517 A | 7/2000 | Yuuki |
| 6,108,482 A | 8/2000 | Roth |
| 6,112,006 A | 8/2000 | Foss |
| 6,179,482 B1 | 1/2001 | Takizawa et al. |
| 6,193,421 B1 | 2/2001 | Tamekuni et al. |
| RE37,079 E | 3/2001 | Stephenson et al. |
| RE37,080 E | 3/2001 | Stephenson et al. |
| 6,200,040 B1 | 3/2001 | Edwards et al. |
| 6,206,581 B1 | 3/2001 | Driscoll et al. |
| 6,224,268 B1 | 5/2001 | Manning et al. |
| 6,224,270 B1 | 5/2001 | Nakajima et al. |
| 6,293,710 B1 | 9/2001 | Lampert et al. |
| 6,298,190 B2 | 10/2001 | Waldron et al. |
| 6,321,013 B1 | 11/2001 | Hardwick et al. |
| 6,356,390 B1 | 3/2002 | Hall, Jr. |
| 6,375,363 B1 | 4/2002 | Harrison et al. |
| 6,404,962 B1 | 6/2002 | Hardwick et al. |
| 6,409,391 B1 | 6/2002 | Chang |
| 6,427,035 B1 | 7/2002 | Mahony |
| 6,428,215 B1 | 8/2002 | Nault |
| 6,466,725 B2 | 10/2002 | Battey et al. |
| 6,496,641 B1 | 12/2002 | Mahony |
| 6,522,804 B1 | 2/2003 | Mahony |
| 6,533,468 B2 | 3/2003 | Nakajima et al. |
| 6,536,956 B2 | 3/2003 | Luther et al. |
| 6,542,652 B1 | 4/2003 | Mahony |
| 6,554,489 B2 | 4/2003 | Kent et al. |
| 6,625,375 B1 | 9/2003 | Mahony |
| 6,629,782 B2 | 10/2003 | Mcphee et al. |
| 6,672,774 B2 | 1/2004 | Theuerkorn et al. |
| 6,678,442 B2 | 1/2004 | Gall et al. |
| 6,695,489 B2 | 2/2004 | Nault |
| 6,702,475 B1 | 3/2004 | Giobbio et al. |
| 6,738,555 B1 | 5/2004 | Cooke et al. |
| 6,748,146 B2 | 6/2004 | Parris |
| 6,771,861 B2 | 8/2004 | Wagner et al. |
| 6,789,950 B1 | 9/2004 | Loder et al. |
| 6,841,729 B2 | 1/2005 | Sakabe et al. |
| 6,856,748 B1 | 2/2005 | Elkins et al. |
| 6,877,906 B2 | 4/2005 | Mizukami et al. |
| 6,880,219 B2 | 4/2005 | Griffioen et al. |
| 6,908,233 B2 | 6/2005 | Nakajima et al. |
| 6,916,120 B2 | 7/2005 | Zimmel et al. |
| 6,944,387 B2 | 9/2005 | Howell et al. |
| 6,962,445 B2 | 11/2005 | Zimmel et al. |
| 6,970,629 B2 | 11/2005 | Lail et al. |
| 6,983,095 B2 | 1/2006 | Reagan et al. |
| 7,013,074 B2 | 3/2006 | Battey et al. |
| 7,044,650 B1 | 5/2006 | Tran et al. |
| 7,052,185 B2 | 5/2006 | Rubino et al. |
| 7,088,899 B2 | 8/2006 | Reagan et al. |
| 7,103,255 B2 | 9/2006 | Reagan et al. |
| 7,103,257 B2 | 9/2006 | Donaldson et al. |
| 7,118,283 B2 | 10/2006 | Nakajima et al. |
| 7,118,284 B2 | 10/2006 | Nakajima et al. |
| 7,120,347 B2 | 10/2006 | Blackwell et al. |
| 7,146,089 B2 | 12/2006 | Reagan et al. |
| 7,150,567 B1 | 12/2006 | Luther et al. |
| 7,171,102 B2 | 1/2007 | Reagan et al. |
| 7,195,403 B2 | 3/2007 | Oki et al. |
| 7,200,317 B2 | 4/2007 | Reagan et al. |
| 7,201,518 B2 | 4/2007 | Holmquist |
| 7,213,975 B2 | 5/2007 | Khemakhem et al. |

(56) References Cited

U.S. PATENT DOCUMENTS

| | | |
|---|---|---|
| 7,213,980 B2 | 5/2007 | Oki et al. |
| 7,228,047 B1 | 6/2007 | Szilagyi et al. |
| 7,232,260 B2 | 6/2007 | Takahashi et al. |
| 7,236,670 B2 | 6/2007 | Lail et al. |
| 7,260,301 B2 | 8/2007 | Barth et al. |
| 7,261,472 B2 | 8/2007 | Suzuki et al. |
| 7,266,265 B2 | 9/2007 | Gall et al. |
| 7,266,274 B2 | 9/2007 | Elkins et al. |
| 7,277,614 B2 | 10/2007 | Cody et al. |
| 7,279,643 B2 | 10/2007 | Morrow et al. |
| 7,292,763 B2 | 11/2007 | Smith et al. |
| 7,302,152 B2 | 11/2007 | Luther et al. |
| 7,318,677 B2 | 1/2008 | Dye |
| 7,326,091 B2 | 2/2008 | Nania et al. |
| 7,330,629 B2 | 2/2008 | Cooke et al. |
| 7,333,708 B2 | 2/2008 | Blackwell et al. |
| 7,336,873 B2 | 2/2008 | Lail et al. |
| 7,341,382 B2 | 3/2008 | Dye |
| 7,346,256 B2 | 3/2008 | Marrs et al. |
| 7,349,605 B2 | 3/2008 | Noonan et al. |
| 7,357,582 B2 | 4/2008 | Oki et al. |
| 7,366,416 B2 | 4/2008 | Ramachandran et al. |
| 7,394,964 B2 | 7/2008 | Tinucci et al. |
| 7,397,997 B2 | 7/2008 | Ferris et al. |
| 7,400,815 B2 | 7/2008 | Mertesdorf et al. |
| 7,407,332 B2 | 8/2008 | Oki et al. |
| 7,428,366 B2 | 9/2008 | Mullaney et al. |
| 7,444,056 B2 | 10/2008 | Allen et al. |
| 7,454,107 B2 | 11/2008 | Miller et al. |
| 7,463,803 B2 | 12/2008 | Cody et al. |
| 7,469,091 B2 | 12/2008 | Mullaney et al. |
| 7,477,824 B2 | 1/2009 | Reagan et al. |
| 7,480,437 B2 | 1/2009 | Ferris et al. |
| 7,484,898 B2 | 2/2009 | Katagiyama et al. |
| 7,485,804 B2 | 2/2009 | Dinh et al. |
| 7,489,849 B2 | 2/2009 | Reagan et al. |
| 7,492,996 B2 | 2/2009 | Kowalczyk et al. |
| 7,512,304 B2 | 3/2009 | Gronvall et al. |
| 7,520,678 B2 | 4/2009 | Khemakhem et al. |
| 7,539,387 B2 | 5/2009 | Mertesdorf et al. |
| 7,539,388 B2 | 5/2009 | Mertesdorf et al. |
| 7,542,645 B1 | 6/2009 | Hua et al. |
| 7,559,702 B2 | 7/2009 | Fujiwara et al. |
| 7,565,055 B2 | 7/2009 | Lu et al. |
| 7,568,845 B2 | 8/2009 | Caveney et al. |
| 7,572,065 B2 | 8/2009 | Lu et al. |
| 7,591,595 B2 | 9/2009 | Lu et al. |
| 7,614,797 B2 | 11/2009 | Lu et al. |
| 7,621,675 B1 | 11/2009 | Bradley |
| 7,627,214 B2 | 12/2009 | Conner et al. |
| 7,627,222 B2 | 12/2009 | Reagan et al. |
| 7,628,545 B2 | 12/2009 | Cody et al. |
| 7,628,548 B2 | 12/2009 | Benjamin et al. |
| 7,646,958 B1 | 1/2010 | Reagan et al. |
| 7,653,282 B2 | 1/2010 | Blackwell et al. |
| 7,654,747 B2 | 2/2010 | Theuerkorn et al. |
| 7,654,748 B2 | 2/2010 | Kuffel et al. |
| 7,658,549 B2 | 2/2010 | Elkins et al. |
| 7,661,995 B2 | 2/2010 | Nania et al. |
| 7,677,814 B2 | 3/2010 | Lu et al. |
| 7,680,388 B2 | 3/2010 | Reagan et al. |
| 7,708,476 B2 | 5/2010 | Liu |
| 7,709,733 B1 | 5/2010 | Plankell |
| 7,712,971 B2 | 5/2010 | Lee et al. |
| 7,722,262 B2 | 5/2010 | Caveney et al. |
| 7,726,998 B2 | 6/2010 | Siebens |
| 7,738,759 B2 | 6/2010 | Parikh et al. |
| 7,740,409 B2 | 6/2010 | Bolton et al. |
| 7,742,117 B2 | 6/2010 | Lee et al. |
| 7,742,670 B2 | 6/2010 | Benjamin et al. |
| 7,744,286 B2 | 6/2010 | Lu et al. |
| 7,744,288 B2 | 6/2010 | Lu et al. |
| 7,747,117 B2 | 6/2010 | Greenwood et al. |
| 7,751,666 B2 | 7/2010 | Parsons et al. |
| 7,753,596 B2 | 7/2010 | Cox |
| 7,762,726 B2 | 7/2010 | Lu et al. |
| 7,785,019 B2 | 8/2010 | Lewallen et al. |
| 7,805,044 B2 | 9/2010 | Reagan et al. |
| 7,806,599 B2 | 10/2010 | Margolin et al. |
| 7,820,090 B2 | 10/2010 | Morrow et al. |
| 7,844,158 B2 | 11/2010 | Gronvall et al. |
| 7,844,160 B2 | 11/2010 | Reagan et al. |
| 7,869,681 B2 | 1/2011 | Battey et al. |
| RE42,094 E | 2/2011 | Barnes et al. |
| 7,881,576 B2 | 2/2011 | Melton et al. |
| 7,889,961 B2 | 2/2011 | Cote et al. |
| 7,891,882 B2 | 2/2011 | Kuffel et al. |
| 7,903,923 B2 | 3/2011 | Gronvall et al. |
| 7,903,925 B2 | 3/2011 | Cooke et al. |
| 7,933,517 B2 | 4/2011 | Ye et al. |
| 7,938,670 B2 | 5/2011 | Nania et al. |
| 7,941,027 B2 | 5/2011 | Mertesdorf et al. |
| 7,959,361 B2 | 6/2011 | Lu et al. |
| 8,002,476 B2 | 8/2011 | Caveney et al. |
| 8,005,335 B2 | 8/2011 | Reagan et al. |
| 8,023,793 B2 | 9/2011 | Kowalczyk et al. |
| 8,025,445 B2 | 9/2011 | Rambow et al. |
| 8,041,178 B2 | 10/2011 | Lu et al. |
| 8,052,333 B2 | 11/2011 | Kuffel et al. |
| 8,055,167 B2 | 11/2011 | Park et al. |
| 8,083,418 B2 | 12/2011 | Fujiwara et al. |
| 8,111,966 B2 | 2/2012 | Holmberg et al. |
| 8,137,002 B2 | 3/2012 | Lu et al. |
| 8,147,147 B2 | 4/2012 | Khemakhem et al. |
| 8,157,454 B2 | 4/2012 | Ito et al. |
| 8,164,050 B2 | 4/2012 | Ford et al. |
| 8,202,008 B2 | 6/2012 | Lu et al. |
| 8,213,761 B2 | 7/2012 | Gronvall et al. |
| 8,218,935 B2 | 7/2012 | Reagan et al. |
| 8,224,145 B2 | 7/2012 | Reagan et al. |
| 8,229,263 B2 | 7/2012 | Parris et al. |
| 8,231,282 B2 | 7/2012 | Kuffel et al. |
| 8,238,706 B2 | 8/2012 | Kachmar |
| 8,238,709 B2 | 8/2012 | Solheid et al. |
| 8,249,450 B2 | 8/2012 | Conner |
| 8,256,971 B2 | 9/2012 | Caveney et al. |
| 8,267,596 B2 | 9/2012 | Theuerkorn |
| RE43,762 E | 10/2012 | Smith et al. |
| 8,301,003 B2 | 10/2012 | De et al. |
| 8,301,004 B2 | 10/2012 | Cooke et al. |
| 8,317,411 B2 | 11/2012 | Fujiwara et al. |
| 8,348,519 B2 | 1/2013 | Kuffel et al. |
| 8,363,999 B2 | 1/2013 | Mertesdorf et al. |
| 8,376,629 B2 | 2/2013 | Cline et al. |
| 8,376,632 B2 | 2/2013 | Blackburn et al. |
| 8,402,587 B2 | 3/2013 | Sugita et al. |
| 8,408,811 B2 | 4/2013 | De et al. |
| 8,414,196 B2 | 4/2013 | Lu et al. |
| 8,466,262 B2 | 6/2013 | Siadak et al. |
| 8,472,773 B2 | 6/2013 | De Jong |
| 8,480,312 B2 | 7/2013 | Smith et al. |
| 8,494,329 B2 | 7/2013 | Nhep et al. |
| 8,496,384 B2 | 7/2013 | Kuffel et al. |
| 8,506,173 B2 | 8/2013 | Lewallen et al. |
| 8,520,996 B2 | 8/2013 | Cowen et al. |
| 8,534,928 B2 | 9/2013 | Cooke et al. |
| 8,536,516 B2 | 9/2013 | Ford et al. |
| 8,556,522 B2 | 10/2013 | Cunningham |
| 8,573,855 B2 | 11/2013 | Nhep |
| 8,591,124 B2 | 11/2013 | Griffiths et al. |
| 8,622,627 B2 | 1/2014 | Elkins et al. |
| 8,622,634 B2 | 1/2014 | Arnold et al. |
| 8,635,733 B2 | 1/2014 | Bardzilowski |
| 8,662,760 B2 | 3/2014 | Cline et al. |
| 8,668,512 B2 | 3/2014 | Chang |
| 8,678,668 B2 | 3/2014 | Cooke et al. |
| 8,687,930 B2 | 4/2014 | Mcdowell et al. |
| 8,702,324 B2 | 4/2014 | Caveney et al. |
| 8,714,835 B2 | 5/2014 | Kuffel et al. |
| 8,727,638 B2 | 5/2014 | Lee et al. |
| 8,737,837 B2 | 5/2014 | Conner et al. |
| 8,755,663 B2 | 6/2014 | Makrides-Saravanos et al. |
| 8,758,046 B2 | 6/2014 | Pezzetti et al. |
| 8,770,861 B2 | 7/2014 | Smith et al. |

(56) References Cited

U.S. PATENT DOCUMENTS

| | | |
|---|---|---|
| 8,770,862 B2 | 7/2014 | Lu et al. |
| 8,837,894 B2 | 9/2014 | Holmberg et al. |
| 8,864,390 B2 | 10/2014 | Chen et al. |
| 8,870,469 B2 | 10/2014 | Kachmar |
| 8,879,883 B2 | 11/2014 | Parikh et al. |
| 8,882,364 B2 | 11/2014 | Busse et al. |
| 8,917,966 B2 | 12/2014 | Thompson et al. |
| 8,974,124 B2 | 3/2015 | Chang |
| 8,992,097 B2 | 3/2015 | Koreeda et al. |
| 8,998,502 B2 | 4/2015 | Benjamin et al. |
| 8,998,506 B2 | 4/2015 | Pepin et al. |
| 9,011,858 B2 | 4/2015 | Siadak et al. |
| 9,039,293 B2 | 5/2015 | Hill et al. |
| 9,075,205 B2 | 7/2015 | Pepe et al. |
| 9,146,364 B2 | 9/2015 | Chen et al. |
| 9,151,906 B2 | 10/2015 | Kobayashi et al. |
| 9,151,909 B2 | 10/2015 | Chen et al. |
| 9,158,074 B2 | 10/2015 | Anderson et al. |
| 9,158,075 B2 | 10/2015 | Benjamin et al. |
| 9,182,567 B2 | 11/2015 | Mullaney |
| 9,188,759 B2 | 11/2015 | Conner |
| 9,207,410 B2 | 12/2015 | Lee et al. |
| 9,207,421 B2 | 12/2015 | Conner |
| 9,213,150 B2 | 12/2015 | Matsui et al. |
| 9,223,106 B2 | 12/2015 | Coan et al. |
| 9,239,441 B2 | 1/2016 | Melton et al. |
| 9,268,102 B2 | 2/2016 | Daems et al. |
| 9,274,286 B2 | 3/2016 | Caveney et al. |
| 9,279,951 B2 | 3/2016 | Mcgranahan et al. |
| 9,285,550 B2 | 3/2016 | Nhep et al. |
| 9,297,974 B2 | 3/2016 | Valderrabano et al. |
| 9,297,976 B2 | 3/2016 | Hill et al. |
| 9,310,570 B2 | 4/2016 | Busse et al. |
| 9,316,791 B2 | 4/2016 | Durrant et al. |
| 9,322,998 B2 | 4/2016 | Miller |
| 9,360,640 B2 | 6/2016 | Ishigami et al. |
| 9,383,539 B2 | 7/2016 | Hill et al. |
| 9,400,364 B2 | 7/2016 | Hill et al. |
| 9,405,068 B2 | 8/2016 | Graham et al. |
| 9,417,403 B2 | 8/2016 | Mullaney et al. |
| 9,423,584 B2 | 8/2016 | Coan et al. |
| 9,435,969 B2 | 9/2016 | Lambourn et al. |
| 9,442,257 B2 | 9/2016 | Lu |
| 9,450,393 B2 | 9/2016 | Thompson et al. |
| 9,459,412 B2 | 10/2016 | Katoh |
| 9,482,819 B2 | 11/2016 | Li et al. |
| 9,482,829 B2 | 11/2016 | Lu et al. |
| 9,513,451 B2 | 12/2016 | Corbille et al. |
| 9,535,229 B2 | 1/2017 | Ott et al. |
| 9,541,711 B2 | 1/2017 | Raven et al. |
| 9,557,504 B2 | 1/2017 | Holmberg et al. |
| 9,581,775 B2 | 2/2017 | Kondo et al. |
| 9,588,304 B2 | 3/2017 | Durrant et al. |
| 9,612,407 B2 | 4/2017 | Kobayashi et al. |
| 9,618,704 B2 | 4/2017 | Dean, Jr. et al. |
| 9,618,718 B2 | 4/2017 | Islam |
| 9,624,296 B2 | 4/2017 | Siadak et al. |
| 9,625,660 B2 | 4/2017 | Daems et al. |
| 9,638,871 B2 | 5/2017 | Bund et al. |
| 9,645,331 B1 | 5/2017 | Kim |
| 9,645,334 B2 | 5/2017 | Ishii et al. |
| 9,651,741 B2 | 5/2017 | Isenhour et al. |
| 9,664,862 B2 | 5/2017 | Lu et al. |
| 9,678,285 B2 | 6/2017 | Hill et al. |
| 9,678,293 B2 | 6/2017 | Coan et al. |
| 9,684,136 B2 | 6/2017 | Cline et al. |
| 9,684,138 B2 | 6/2017 | Lu |
| 9,696,500 B2 | 7/2017 | Barnette et al. |
| 9,711,868 B2 | 7/2017 | Scheucher |
| 9,720,193 B2 | 8/2017 | Nishimura |
| 9,733,436 B2 | 8/2017 | Van et al. |
| 9,739,951 B2 | 8/2017 | Busse et al. |
| 9,762,322 B1 | 9/2017 | Amundson |
| 9,766,416 B1 | 9/2017 | Kim |
| 9,772,457 B2 | 9/2017 | Hill et al. |
| 9,804,343 B2 | 10/2017 | Hill et al. |
| 9,810,855 B2 | 11/2017 | Cox et al. |
| 9,810,856 B2 | 11/2017 | Graham et al. |
| 9,829,658 B2 | 11/2017 | Nishimura |
| 9,829,668 B2 | 11/2017 | Claessens et al. |
| 9,851,522 B2 | 12/2017 | Reagan et al. |
| 9,857,540 B2 | 1/2018 | Ahmed et al. |
| 9,864,151 B2 | 1/2018 | Lu |
| 9,878,038 B2 | 1/2018 | Siadak et al. |
| 9,885,841 B2 | 2/2018 | Pepe et al. |
| 9,891,391 B2 | 2/2018 | Watanabe |
| 9,905,933 B2 | 2/2018 | Scheucher |
| 9,910,236 B2 | 3/2018 | Cooke et al. |
| 9,921,375 B2 | 3/2018 | Compton et al. |
| 9,927,580 B2 | 3/2018 | Bretz et al. |
| 9,933,582 B1 | 4/2018 | Lin |
| 9,939,591 B2 | 4/2018 | Mullaney et al. |
| 9,964,713 B2 | 5/2018 | Barnette et al. |
| 9,964,715 B2 | 5/2018 | Lu |
| 9,977,194 B2 | 5/2018 | Waldron et al. |
| 9,977,198 B2 | 5/2018 | Bund et al. |
| 9,983,374 B2 | 5/2018 | Li et al. |
| 10,007,068 B2 | 6/2018 | Hill et al. |
| 10,031,302 B2 | 7/2018 | Ji et al. |
| 10,036,859 B2 | 7/2018 | Daems et al. |
| 10,038,946 B2 | 7/2018 | Smolorz |
| 10,042,136 B2 | 8/2018 | Reagan et al. |
| 10,061,090 B2 | 8/2018 | Coenegracht |
| 10,073,224 B2 | 9/2018 | Tong et al. |
| 10,094,986 B2 | 10/2018 | Barnette et al. |
| 10,101,538 B2 | 10/2018 | Lu et al. |
| 10,107,968 B2 | 10/2018 | Tong et al. |
| 10,109,927 B2 | 10/2018 | Scheucher |
| 10,114,176 B2 | 10/2018 | Gimblet et al. |
| 10,126,508 B2 | 11/2018 | Compton et al. |
| 10,180,541 B2 | 1/2019 | Coenegracht et al. |
| 10,209,454 B2 | 2/2019 | Isenhour et al. |
| 10,215,930 B2 | 2/2019 | Mullaney et al. |
| 10,235,184 B2 | 3/2019 | Walker |
| 10,261,268 B2 | 4/2019 | Theuerkorn |
| 10,268,011 B2 | 4/2019 | Courchaine et al. |
| 10,288,820 B2 | 5/2019 | Coenegracht |
| 10,317,628 B2 | 6/2019 | Van et al. |
| 10,324,263 B2 | 6/2019 | Bund et al. |
| 10,338,323 B2 | 7/2019 | Lu et al. |
| 10,353,154 B2 | 7/2019 | Ott et al. |
| 10,353,156 B2 | 7/2019 | Hill et al. |
| 10,359,577 B2 | 7/2019 | Dannoux et al. |
| 10,371,914 B2 | 8/2019 | Coan et al. |
| 10,379,298 B2 | 8/2019 | Dannoux et al. |
| 10,386,584 B2 | 8/2019 | Rosson |
| 10,401,575 B2 | 9/2019 | Daily et al. |
| 10,401,578 B2 | 9/2019 | Coenegracht |
| 10,401,584 B2 | 9/2019 | Coan et al. |
| 10,409,007 B2 | 9/2019 | Kadar-Kallen et al. |
| 10,422,962 B2 | 9/2019 | Coenegracht |
| 10,422,970 B2 | 9/2019 | Holmberg et al. |
| 10,429,593 B2 | 10/2019 | Baca et al. |
| 10,429,594 B2 | 10/2019 | Dannoux et al. |
| 10,434,173 B2 | 10/2019 | Siadak et al. |
| 10,439,295 B2 | 10/2019 | Scheucher |
| 10,444,442 B2 | 10/2019 | Takano et al. |
| 10,451,811 B2 | 10/2019 | Coenegracht et al. |
| 10,451,817 B2 | 10/2019 | Lu |
| 10,451,830 B2 | 10/2019 | Szumacher et al. |
| 10,488,597 B2 | 11/2019 | Parikh et al. |
| 10,495,822 B2 | 12/2019 | Nhep |
| 10,502,916 B2 | 12/2019 | Coan et al. |
| 10,520,683 B2 | 12/2019 | Nhep |
| 10,539,745 B2 | 1/2020 | Kamada et al. |
| 10,578,821 B2 | 3/2020 | Ott et al. |
| 10,585,246 B2 | 3/2020 | Bretz et al. |
| 10,591,678 B2 | 3/2020 | Mullaney et al. |
| 10,605,998 B2 | 3/2020 | Rosson |
| 10,606,006 B2 | 3/2020 | Hill et al. |
| 10,613,278 B2 | 4/2020 | Kempeneers et al. |
| 10,620,388 B2 | 4/2020 | Isenhour et al. |
| 10,656,347 B2 | 5/2020 | Kato |
| 10,677,998 B2 | 6/2020 | Van et al. |

(56) References Cited

U.S. PATENT DOCUMENTS

| | | |
|---|---|---|
| 10,680,343 B2 | 6/2020 | Scheucher |
| 10,712,516 B2 | 7/2020 | Courchaine et al. |
| 10,739,534 B2 | 8/2020 | Murray et al. |
| 10,746,939 B2 | 8/2020 | Lu et al. |
| 10,761,274 B2 | 9/2020 | Pepe et al. |
| 10,782,487 B2 | 9/2020 | Lu |
| 10,802,236 B2 | 10/2020 | Kowalczyk et al. |
| 10,830,967 B2 | 11/2020 | Pimentel et al. |
| 10,830,975 B2 | 11/2020 | Vaughn et al. |
| 10,852,498 B2 | 12/2020 | Hill et al. |
| 10,852,499 B2 | 12/2020 | Cooke et al. |
| 10,859,771 B2 | 12/2020 | Nhep |
| 10,859,781 B2 | 12/2020 | Hill et al. |
| 10,962,731 B2 | 3/2021 | Coenegracht |
| 10,976,500 B2 | 4/2021 | Ott et al. |
| 11,061,191 B2 | 7/2021 | Van et al. |
| 11,290,188 B2 | 3/2022 | Tuccio et al. |
| 2001/0002220 A1 | 5/2001 | Throckmorton et al. |
| 2001/0012428 A1 | 8/2001 | Nakajima et al. |
| 2002/0012502 A1 | 1/2002 | Farrar et al. |
| 2002/0064364 A1 | 5/2002 | Battey et al. |
| 2002/0076165 A1 | 6/2002 | Childers et al. |
| 2002/0079697 A1 | 6/2002 | Griffioen et al. |
| 2002/0081077 A1 | 6/2002 | Nault |
| 2002/0122634 A1 | 9/2002 | Miyake et al. |
| 2002/0131721 A1 | 9/2002 | Gaio et al. |
| 2002/0159745 A1 | 10/2002 | Howell et al. |
| 2002/0172477 A1 | 11/2002 | Quinn et al. |
| 2003/0031447 A1 | 2/2003 | Nault |
| 2003/0059181 A1 | 3/2003 | Jackman et al. |
| 2003/0063866 A1 | 4/2003 | Melton et al. |
| 2003/0080555 A1 | 5/2003 | Griffioen et al. |
| 2003/0086664 A1 | 5/2003 | Moisel et al. |
| 2003/0123813 A1 | 7/2003 | Ravasio et al. |
| 2003/0128936 A1 | 7/2003 | Fahrnbauer et al. |
| 2003/0165311 A1 | 9/2003 | Wagman et al. |
| 2003/0201117 A1 | 10/2003 | Sakabe et al. |
| 2003/0206705 A1 | 11/2003 | Mcalpine et al. |
| 2003/0210875 A1 | 11/2003 | Wagner et al. |
| 2004/0057676 A1 | 3/2004 | Doss et al. |
| 2004/0057681 A1 | 3/2004 | Quinn et al. |
| 2004/0072454 A1 | 4/2004 | Nakajima et al. |
| 2004/0076377 A1 | 4/2004 | Mizukami et al. |
| 2004/0076386 A1 | 4/2004 | Nechitailo |
| 2004/0086238 A1 | 5/2004 | Finona et al. |
| 2004/0096162 A1 | 5/2004 | Kocher et al. |
| 2004/0157499 A1 | 8/2004 | Nania et al. |
| 2004/0206542 A1 | 10/2004 | Gladd et al. |
| 2004/0240808 A1 | 12/2004 | Rhoney et al. |
| 2004/0247251 A1 | 12/2004 | Rubino et al. |
| 2004/0252954 A1 | 12/2004 | Ginocchio et al. |
| 2004/0262023 A1 | 12/2004 | Morrow et al. |
| 2005/0019031 A1 | 1/2005 | Ye et al. |
| 2005/0036744 A1 | 2/2005 | Caveney et al. |
| 2005/0036786 A1 | 2/2005 | Ramachandran et al. |
| 2005/0053342 A1 | 3/2005 | Melton et al. |
| 2005/0084215 A1 | 4/2005 | Grzegorzewska et al. |
| 2005/0105873 A1 | 5/2005 | Reagan et al. |
| 2005/0123422 A1 | 6/2005 | Lilie |
| 2005/0129379 A1 | 6/2005 | Reagan et al. |
| 2005/0163448 A1 | 7/2005 | Blackwell et al. |
| 2005/0175307 A1 | 8/2005 | Battey et al. |
| 2005/0180697 A1 | 8/2005 | De Marchi |
| 2005/0213890 A1 | 9/2005 | Barnes et al. |
| 2005/0213892 A1 | 9/2005 | Barnes et al. |
| 2005/0213899 A1 | 9/2005 | Hurley et al. |
| 2005/0213902 A1 | 9/2005 | Parsons |
| 2005/0213921 A1 | 9/2005 | Mertesdorf et al. |
| 2005/0226568 A1 | 10/2005 | Nakajima et al. |
| 2005/0232550 A1 | 10/2005 | Nakajima et al. |
| 2005/0232552 A1 | 10/2005 | Takahashi et al. |
| 2005/0232567 A1 | 10/2005 | Reagan et al. |
| 2005/0244108 A1 | 11/2005 | Billman et al. |
| 2005/0271344 A1 | 12/2005 | Grubish et al. |
| 2005/0281510 A1 | 12/2005 | Vo et al. |
| 2005/0281514 A1 | 12/2005 | Oki et al. |
| 2005/0286837 A1 | 12/2005 | Oki et al. |
| 2005/0286838 A1 | 12/2005 | Oki et al. |
| 2006/0002668 A1 | 1/2006 | Lail et al. |
| 2006/0008232 A1 | 1/2006 | Reagan et al. |
| 2006/0008233 A1 | 1/2006 | Reagan et al. |
| 2006/0008234 A1 | 1/2006 | Reagan et al. |
| 2006/0045428 A1 | 3/2006 | Theuerkorn et al. |
| 2006/0045430 A1 | 3/2006 | Theuerkorn et al. |
| 2006/0056769 A1 | 3/2006 | Khemakhem et al. |
| 2006/0056770 A1 | 3/2006 | Schmitz |
| 2006/0088247 A1 | 4/2006 | Tran et al. |
| 2006/0093278 A1 | 5/2006 | Elkins et al. |
| 2006/0093303 A1 | 5/2006 | Reagan et al. |
| 2006/0093304 A1 | 5/2006 | Battey et al. |
| 2006/0098932 A1 | 5/2006 | Battey et al. |
| 2006/0120672 A1 | 6/2006 | Cody et al. |
| 2006/0127016 A1 | 6/2006 | Baird et al. |
| 2006/0133748 A1 | 6/2006 | Seddon et al. |
| 2006/0133758 A1 | 6/2006 | Mullaney et al. |
| 2006/0133759 A1 | 6/2006 | Mullaney et al. |
| 2006/0147172 A1 | 7/2006 | Luther et al. |
| 2006/0153503 A1 | 7/2006 | Suzuki et al. |
| 2006/0153517 A1 | 7/2006 | Reagan et al. |
| 2006/0165352 A1 | 7/2006 | Caveney et al. |
| 2006/0171638 A1 | 8/2006 | Dye |
| 2006/0171640 A1 | 8/2006 | Dye |
| 2006/0210750 A1 | 9/2006 | Morrow et al. |
| 2006/0233506 A1 | 10/2006 | Noonan et al. |
| 2006/0257092 A1 | 11/2006 | Lu et al. |
| 2006/0269204 A1 | 11/2006 | Barth et al. |
| 2006/0269208 A1 | 11/2006 | Allen et al. |
| 2006/0280420 A1 | 12/2006 | Blackwell et al. |
| 2007/0031100 A1 | 2/2007 | Garcia et al. |
| 2007/0036483 A1 | 2/2007 | Shin et al. |
| 2007/0041732 A1 | 2/2007 | Oki et al. |
| 2007/0047897 A1 | 3/2007 | Cooke et al. |
| 2007/0110374 A1 | 5/2007 | Oki et al. |
| 2007/0116413 A1 | 5/2007 | Cox |
| 2007/0127872 A1 | 6/2007 | Caveney et al. |
| 2007/0140642 A1 | 6/2007 | Mertesdorf et al. |
| 2007/0160327 A1 | 7/2007 | Lewallen et al. |
| 2007/0237484 A1 | 10/2007 | Reagan et al. |
| 2007/0263961 A1 | 11/2007 | Khemakhem et al. |
| 2007/0286554 A1 | 12/2007 | Kuffel et al. |
| 2008/0019641 A1 | 1/2008 | Elkins et al. |
| 2008/0020532 A1 | 1/2008 | Monfray et al. |
| 2008/0044145 A1 | 2/2008 | Jenkins et al. |
| 2008/0069511 A1 | 3/2008 | Blackwell et al. |
| 2008/0080817 A1 | 4/2008 | Melton et al. |
| 2008/0112681 A1 | 5/2008 | Battey et al. |
| 2008/0131068 A1 | 6/2008 | Mertesdorf et al. |
| 2008/0138016 A1 | 6/2008 | Katagiyama et al. |
| 2008/0138025 A1 | 6/2008 | Reagan et al. |
| 2008/0166906 A1 | 7/2008 | Nania et al. |
| 2008/0175541 A1 | 7/2008 | Lu et al. |
| 2008/0175542 A1 | 7/2008 | Lu et al. |
| 2008/0175544 A1 | 7/2008 | Fujiwara et al. |
| 2008/0175548 A1 | 7/2008 | Knecht et al. |
| 2008/0226252 A1 | 9/2008 | Mertesdorf et al. |
| 2008/0232743 A1 | 9/2008 | Gronvall et al. |
| 2008/0260344 A1 | 10/2008 | Smith et al. |
| 2008/0260345 A1 | 10/2008 | Mertesdorf et al. |
| 2008/0264664 A1 | 10/2008 | Dinh et al. |
| 2008/0273837 A1 | 11/2008 | Margolin et al. |
| 2009/0003772 A1 | 1/2009 | Lu et al. |
| 2009/0034923 A1 | 2/2009 | Miller et al. |
| 2009/0041411 A1 | 2/2009 | Melton et al. |
| 2009/0060421 A1 | 3/2009 | Parikh et al. |
| 2009/0060423 A1 | 3/2009 | Melton et al. |
| 2009/0067791 A1 | 3/2009 | Greenwood et al. |
| 2009/0067849 A1 | 3/2009 | Oki et al. |
| 2009/0074363 A1 | 3/2009 | Parsons et al. |
| 2009/0074369 A1 | 3/2009 | Bolton et al. |
| 2009/0123115 A1 | 5/2009 | Gronvall et al. |
| 2009/0129729 A1 | 5/2009 | Caveney et al. |
| 2009/0148101 A1 | 6/2009 | Lu et al. |
| 2009/0148102 A1 | 6/2009 | Lu et al. |
| 2009/0148103 A1 | 6/2009 | Lu et al. |

(56) References Cited

U.S. PATENT DOCUMENTS

| | | |
|---|---|---|
| 2009/0148104 A1 | 6/2009 | Lu et al. |
| 2009/0148118 A1 | 6/2009 | Gronvall et al. |
| 2009/0148120 A1 | 6/2009 | Reagan et al. |
| 2009/0162016 A1 | 6/2009 | Lu et al. |
| 2009/0185835 A1 | 7/2009 | Park et al. |
| 2009/0190895 A1 | 7/2009 | Reagan et al. |
| 2009/0238531 A1 | 9/2009 | Holmberg et al. |
| 2009/0245737 A1 | 10/2009 | Fujiwara et al. |
| 2009/0245743 A1 | 10/2009 | Cote et al. |
| 2009/0263097 A1 | 10/2009 | Solheid et al. |
| 2009/0297112 A1 | 12/2009 | Mertesdorf et al. |
| 2009/0317039 A1 | 12/2009 | Blazer et al. |
| 2009/0317045 A1 | 12/2009 | Reagan et al. |
| 2010/0008909 A1 | 1/2010 | Siadak et al. |
| 2010/0014813 A1 | 1/2010 | Ito et al. |
| 2010/0014824 A1 | 1/2010 | Lu et al. |
| 2010/0014867 A1 | 1/2010 | Ramanitra et al. |
| 2010/0015834 A1 | 1/2010 | Siebens |
| 2010/0021254 A1 | 1/2010 | Jenkins et al. |
| 2010/0034502 A1 | 2/2010 | Lu et al. |
| 2010/0040331 A1 | 2/2010 | Khemakhem et al. |
| 2010/0040338 A1 | 2/2010 | Sek |
| 2010/0061685 A1 | 3/2010 | Kowalczyk et al. |
| 2010/0074578 A1 | 3/2010 | Imaizumi et al. |
| 2010/0080516 A1 | 4/2010 | Coleman et al. |
| 2010/0086260 A1 | 4/2010 | Parikh et al. |
| 2010/0086267 A1 | 4/2010 | Cooke et al. |
| 2010/0092129 A1 | 4/2010 | Conner |
| 2010/0092133 A1 | 4/2010 | Conner |
| 2010/0092136 A1 | 4/2010 | Nhep |
| 2010/0092146 A1 | 4/2010 | Conner et al. |
| 2010/0092169 A1 | 4/2010 | Conner et al. |
| 2010/0092171 A1 | 4/2010 | Conner |
| 2010/0129034 A1 | 5/2010 | Kuffel et al. |
| 2010/0144183 A1 | 6/2010 | Nania et al. |
| 2010/0172616 A1 | 7/2010 | Lu et al. |
| 2010/0197222 A1 | 8/2010 | Scheucher |
| 2010/0215321 A1 | 8/2010 | Jenkins |
| 2010/0220962 A1 | 9/2010 | Caveney et al. |
| 2010/0226615 A1 | 9/2010 | Reagan et al. |
| 2010/0232753 A1 | 9/2010 | Parris et al. |
| 2010/0247053 A1 | 9/2010 | Cowen et al. |
| 2010/0266242 A1 | 10/2010 | Lu et al. |
| 2010/0266244 A1 | 10/2010 | Lu et al. |
| 2010/0266245 A1 | 10/2010 | Sabo |
| 2010/0272399 A1 | 10/2010 | Griffiths et al. |
| 2010/0284662 A1 | 11/2010 | Reagan et al. |
| 2010/0290741 A1 | 11/2010 | Lu et al. |
| 2010/0303426 A1 | 12/2010 | Davis |
| 2010/0303427 A1 | 12/2010 | Rambow et al. |
| 2010/0310213 A1 | 12/2010 | Lewallen et al. |
| 2010/0322563 A1 | 12/2010 | Melton et al. |
| 2010/0329625 A1 | 12/2010 | Reagan et al. |
| 2011/0019964 A1 | 1/2011 | Nhep et al. |
| 2011/0047731 A1 | 3/2011 | Sugita et al. |
| 2011/0067452 A1 | 3/2011 | Gronvall et al. |
| 2011/0069932 A1 | 3/2011 | Overton et al. |
| 2011/0108719 A1 | 5/2011 | Ford et al. |
| 2011/0116749 A1 | 5/2011 | Kuffel et al. |
| 2011/0123166 A1 | 5/2011 | Reagan et al. |
| 2011/0129186 A1 | 6/2011 | Lewallen et al. |
| 2011/0164854 A1 | 7/2011 | Desard et al. |
| 2011/0262099 A1 | 10/2011 | Castonguay et al. |
| 2011/0262100 A1 | 10/2011 | Reagan et al. |
| 2011/0299814 A1 | 12/2011 | Nakagawa |
| 2011/0305421 A1 | 12/2011 | Caveney et al. |
| 2012/0008909 A1 | 1/2012 | Mertesdorf et al. |
| 2012/0045179 A1 | 2/2012 | Theuerkorn |
| 2012/0063724 A1 | 3/2012 | Kuffel et al. |
| 2012/0063729 A1 | 3/2012 | Fujiwara et al. |
| 2012/0106912 A1 | 5/2012 | Mcgranahan et al. |
| 2012/0106913 A1 | 5/2012 | Makrides-Saravanos et al. |
| 2012/0134629 A1 | 5/2012 | Lu et al. |
| 2012/0183268 A1 | 7/2012 | De et al. |
| 2012/0213478 A1 | 8/2012 | Chen et al. |
| 2012/0251060 A1 | 10/2012 | Hurley |
| 2012/0251063 A1 | 10/2012 | Reagan et al. |
| 2012/0252244 A1 | 10/2012 | Elkins et al. |
| 2012/0275749 A1 | 11/2012 | Kuffel et al. |
| 2012/0321256 A1 | 12/2012 | Caveney et al. |
| 2013/0004122 A1 | 1/2013 | Kingsbury |
| 2013/0020480 A1 | 1/2013 | Ford et al. |
| 2013/0034333 A1 | 2/2013 | Holmberg et al. |
| 2013/0064506 A1 | 3/2013 | Eberle et al. |
| 2013/0094821 A1 | 4/2013 | Logan |
| 2013/0109213 A1 | 5/2013 | Chang |
| 2013/0114930 A1 | 5/2013 | Smith et al. |
| 2013/0136402 A1 | 5/2013 | Kuffel et al. |
| 2013/0170834 A1 | 7/2013 | Cho et al. |
| 2013/0209099 A1 | 8/2013 | Reagan et al. |
| 2013/0236139 A1 | 9/2013 | Chen et al. |
| 2013/0266562 A1 | 10/2013 | Siadak et al. |
| 2013/0315538 A1 | 11/2013 | Kuffel et al. |
| 2014/0016902 A1 | 1/2014 | Pepe et al. |
| 2014/0056561 A1 | 2/2014 | Lu et al. |
| 2014/0079356 A1 | 3/2014 | Pepin et al. |
| 2014/0133804 A1 | 5/2014 | Lu et al. |
| 2014/0133806 A1 | 5/2014 | Hill et al. |
| 2014/0133807 A1 | 5/2014 | Katoh |
| 2014/0133808 A1 | 5/2014 | Hill et al. |
| 2014/0153876 A1 | 6/2014 | Dendas et al. |
| 2014/0153878 A1 | 6/2014 | Mullaney |
| 2014/0161397 A1 | 6/2014 | Gallegos et al. |
| 2014/0205257 A1 | 7/2014 | Durrant et al. |
| 2014/0219609 A1 | 8/2014 | Nielson et al. |
| 2014/0219622 A1 | 8/2014 | Coan et al. |
| 2014/0233896 A1 | 8/2014 | Ishigami et al. |
| 2014/0241670 A1 | 8/2014 | Barnette et al. |
| 2014/0241671 A1 | 8/2014 | Koreeda et al. |
| 2014/0241689 A1 | 8/2014 | Bradley et al. |
| 2014/0254987 A1 | 9/2014 | Caveney et al. |
| 2014/0294395 A1 | 10/2014 | Waldron et al. |
| 2014/0314379 A1 | 10/2014 | Lu et al. |
| 2014/0328559 A1 | 11/2014 | Kobayashi et al. |
| 2014/0341511 A1 | 11/2014 | Daems et al. |
| 2014/0348467 A1 | 11/2014 | Cote et al. |
| 2014/0355936 A1 | 12/2014 | Bund et al. |
| 2015/0003787 A1 | 1/2015 | Chen et al. |
| 2015/0003788 A1 | 1/2015 | Chen et al. |
| 2015/0036982 A1 | 2/2015 | Nhep et al. |
| 2015/0110451 A1 | 4/2015 | Blazer et al. |
| 2015/0153532 A1 | 6/2015 | Holmberg et al. |
| 2015/0168657 A1 | 6/2015 | Islam |
| 2015/0183869 A1 | 7/2015 | Siadak et al. |
| 2015/0185423 A1 | 7/2015 | Matsui et al. |
| 2015/0253527 A1 | 9/2015 | Hill et al. |
| 2015/0253528 A1 | 9/2015 | Corbille et al. |
| 2015/0268423 A1 | 9/2015 | Burkholder et al. |
| 2015/0268434 A1 | 9/2015 | Barnette et al. |
| 2015/0293310 A1 | 10/2015 | Kanno |
| 2015/0309274 A1 | 10/2015 | Hurley et al. |
| 2015/0316727 A1 | 11/2015 | Kondo et al. |
| 2015/0346435 A1 | 12/2015 | Kato |
| 2015/0346436 A1 | 12/2015 | Pepe et al. |
| 2016/0015885 A1 | 1/2016 | Pananen et al. |
| 2016/0041346 A1 | 2/2016 | Barnette et al. |
| 2016/0062053 A1 | 3/2016 | Mullaney |
| 2016/0085032 A1 | 3/2016 | Lu et al. |
| 2016/0109671 A1 | 4/2016 | Coan et al. |
| 2016/0116686 A1 | 4/2016 | Durrant et al. |
| 2016/0126667 A1 | 5/2016 | Droesbeke et al. |
| 2016/0131851 A1 | 5/2016 | Theuerkorn |
| 2016/0131857 A1 | 5/2016 | Pimentel et al. |
| 2016/0139346 A1 | 5/2016 | Bund et al. |
| 2016/0154184 A1 | 6/2016 | Bund et al. |
| 2016/0161682 A1 | 6/2016 | Nishimura |
| 2016/0161688 A1 | 6/2016 | Nishimura |
| 2016/0161689 A1 | 6/2016 | Nishimura |
| 2016/0187590 A1 | 6/2016 | Lu |
| 2016/0202431 A1 | 7/2016 | Hill et al. |
| 2016/0209599 A1 | 7/2016 | Van et al. |
| 2016/0209602 A1 | 7/2016 | Theuerkorn |
| 2016/0216468 A1 | 7/2016 | Gimblet et al. |
| 2016/0238810 A1 | 8/2016 | Hubbard et al. |

(56) References Cited

U.S. PATENT DOCUMENTS

| | | |
|---|---|---|
| 2016/0246019 A1 | 8/2016 | Ishii et al. |
| 2016/0259133 A1 | 9/2016 | Kobayashi et al. |
| 2016/0259134 A1 | 9/2016 | Daems et al. |
| 2016/0306122 A1 | 10/2016 | Tong et al. |
| 2016/0327754 A1 | 11/2016 | Hill et al. |
| 2017/0023758 A1 | 1/2017 | Reagan et al. |
| 2017/0045699 A1 | 2/2017 | Coan et al. |
| 2017/0052325 A1 | 2/2017 | Mullaney et al. |
| 2017/0123163 A1 | 5/2017 | Lu et al. |
| 2017/0123165 A1 | 5/2017 | Barnette et al. |
| 2017/0131509 A1 | 5/2017 | Xiao et al. |
| 2017/0139158 A1 | 5/2017 | Coenegracht |
| 2017/0168248 A1 | 6/2017 | Hayauchi et al. |
| 2017/0168256 A1 | 6/2017 | Reagan et al. |
| 2017/0170596 A1 | 6/2017 | Goossens et al. |
| 2017/0176252 A1 | 6/2017 | Marple et al. |
| 2017/0176690 A1 | 6/2017 | Bretz et al. |
| 2017/0182160 A1 | 6/2017 | Siadak et al. |
| 2017/0219782 A1 | 8/2017 | Nishimura |
| 2017/0235067 A1 | 8/2017 | Holmberg et al. |
| 2017/0238822 A1 | 8/2017 | Young et al. |
| 2017/0254961 A1 | 9/2017 | Kamada et al. |
| 2017/0254962 A1 | 9/2017 | Mueller-Schlomka et al. |
| 2017/0261696 A1 | 9/2017 | Compton et al. |
| 2017/0261698 A1 | 9/2017 | Compton et al. |
| 2017/0261699 A1 | 9/2017 | Compton et al. |
| 2017/0285275 A1 | 10/2017 | Hill et al. |
| 2017/0288315 A1 | 10/2017 | Scheucher |
| 2017/0293091 A1 | 10/2017 | Lu et al. |
| 2017/0336587 A1 | 11/2017 | Coan et al. |
| 2017/0343741 A1 | 11/2017 | Coenegracht et al. |
| 2017/0343745 A1 | 11/2017 | Rosson |
| 2017/0351037 A1 | 12/2017 | Watanabe et al. |
| 2018/0031774 A1 | 2/2018 | Van et al. |
| 2018/0081127 A1 | 3/2018 | Coenegracht |
| 2018/0143386 A1 | 5/2018 | Coan et al. |
| 2018/0151960 A1 | 5/2018 | Scheucher |
| 2018/0180831 A1 | 6/2018 | Blazer et al. |
| 2018/0224610 A1 | 8/2018 | Pimentel et al. |
| 2018/0239094 A1 | 8/2018 | Barnette et al. |
| 2018/0246283 A1 | 8/2018 | Pepe et al. |
| 2018/0259721 A1 | 9/2018 | Bund et al. |
| 2018/0329149 A1 | 11/2018 | Mullaney et al. |
| 2018/0372962 A1 | 12/2018 | Isenhour et al. |
| 2019/0004251 A1 | 1/2019 | Dannoux et al. |
| 2019/0004255 A1 | 1/2019 | Dannoux et al. |
| 2019/0004256 A1 | 1/2019 | Rosson |
| 2019/0004258 A1 | 1/2019 | Dannoux et al. |
| 2019/0011641 A1 | 1/2019 | Isenhour et al. |
| 2019/0018210 A1 | 1/2019 | Coan et al. |
| 2019/0033532 A1 | 1/2019 | Gimblet et al. |
| 2019/0038743 A1 | 2/2019 | Siadak et al. |
| 2019/0041584 A1 | 2/2019 | Coenegracht et al. |
| 2019/0041585 A1 | 2/2019 | Bretz et al. |
| 2019/0041595 A1 | 2/2019 | Reagan et al. |
| 2019/0058259 A1 | 2/2019 | Scheucher |
| 2019/0107677 A1 | 4/2019 | Coenegracht et al. |
| 2019/0147202 A1 | 5/2019 | Harney |
| 2019/0162910 A1 | 5/2019 | Gurreri |
| 2019/0162914 A1 | 5/2019 | Baca et al. |
| 2019/0187396 A1 | 6/2019 | Finnegan et al. |
| 2019/0235177 A1 | 8/2019 | Lu et al. |
| 2019/0250338 A1 | 8/2019 | Mullaney et al. |
| 2019/0271817 A1 | 9/2019 | Coenegracht |
| 2019/0324217 A1 | 10/2019 | Lu et al. |
| 2019/0339460 A1 | 11/2019 | Dannoux et al. |
| 2019/0339461 A1 | 11/2019 | Dannoux et al. |
| 2019/0369336 A1 | 12/2019 | Van et al. |
| 2019/0369345 A1 | 12/2019 | Reagan et al. |
| 2019/0374637 A1 | 12/2019 | Siadak et al. |
| 2020/0012051 A1 | 1/2020 | Coenegracht et al. |
| 2020/0036101 A1 | 1/2020 | Scheucher |
| 2020/0049922 A1 | 2/2020 | Rosson |
| 2020/0057205 A1 | 2/2020 | Dannoux et al. |
| 2020/0057222 A1 | 2/2020 | Dannoux et al. |
| 2020/0057223 A1 | 2/2020 | Dannoux et al. |
| 2020/0057224 A1 | 2/2020 | Dannoux et al. |
| 2020/0057723 A1 | 2/2020 | Chirca et al. |
| 2020/0096705 A1 | 3/2020 | Rosson |
| 2020/0096709 A1 | 3/2020 | Rosson |
| 2020/0096710 A1 | 3/2020 | Rosson |
| 2020/0103599 A1 | 4/2020 | Rosson |
| 2020/0103608 A1 | 4/2020 | Hill et al. |
| 2020/0110229 A1 | 4/2020 | Dannoux et al. |
| 2020/0110234 A1 | 4/2020 | Holmberg et al. |
| 2020/0116949 A1 | 4/2020 | Rosson |
| 2020/0116952 A1 | 4/2020 | Rosson |
| 2020/0116953 A1 | 4/2020 | Rosson |
| 2020/0116954 A1 | 4/2020 | Rosson |
| 2020/0116958 A1 | 4/2020 | Dannoux et al. |
| 2020/0116962 A1 | 4/2020 | Dannoux et al. |
| 2020/0124812 A1 | 4/2020 | Dannoux et al. |
| 2020/0132939 A1 | 4/2020 | Coenegracht et al. |
| 2020/0192042 A1 | 6/2020 | Coan et al. |
| 2020/0209492 A1 | 7/2020 | Rosson |
| 2020/0218017 A1 | 7/2020 | Coenegracht |
| 2020/0225422 A1 | 7/2020 | Van et al. |
| 2020/0225424 A1 | 7/2020 | Coenegracht |
| 2020/0241211 A1 | 7/2020 | Shonkwiler et al. |
| 2020/0348476 A1 | 11/2020 | Hill et al. |
| 2020/0371306 A1 | 11/2020 | Mosier et al. |
| 2020/0393629 A1 | 12/2020 | Hill et al. |
| 2021/0103099 A1* | 4/2021 | Butler .................. G02F 1/0115 |

FOREIGN PATENT DOCUMENTS

| | | |
|---|---|---|
| CN | 1071012 A | 4/1993 |
| CN | 1213783 A | 4/1999 |
| CN | 1114839 C | 7/2003 |
| CN | 1646962 A | 7/2005 |
| CN | 1833188 A | 9/2006 |
| CN | 1922523 A | 2/2007 |
| CN | 1985205 A | 6/2007 |
| CN | 101084461 A | 12/2007 |
| CN | 101111790 A | 1/2008 |
| CN | 101195453 A | 6/2008 |
| CN | 201404194 Y | 2/2010 |
| CN | 101846773 A | 9/2010 |
| CN | 101939680 A | 1/2011 |
| CN | 201704194 U | 1/2011 |
| CN | 102346281 A | 2/2012 |
| CN | 202282523 U | 6/2012 |
| CN | 203224645 U | 10/2013 |
| CN | 203396982 U | 1/2014 |
| CN | 103713362 A | 4/2014 |
| CN | 104064903 A | 9/2014 |
| CN | 104280830 A | 1/2015 |
| CN | 104603656 A | 5/2015 |
| CN | 105467529 A | 4/2016 |
| EP | 0026553 A1 | 4/1981 |
| EP | 0244791 A2 | 11/1987 |
| EP | 0547788 A1 | 6/1993 |
| EP | 0782025 A1 | 7/1997 |
| EP | 0856751 A1 | 8/1998 |
| EP | 0957381 A1 | 11/1999 |
| EP | 1243957 A2 | 9/2002 |
| EP | 1391762 A1 | 2/2004 |
| EP | 1431786 A2 | 6/2004 |
| EP | 1438622 A2 | 7/2004 |
| EP | 1678537 A1 | 7/2006 |
| EP | 1759231 A1 | 3/2007 |
| EP | 1810062 A1 | 7/2007 |
| EP | 2069845 A2 | 6/2009 |
| EP | 2149063 A1 | 2/2010 |
| EP | 2150847 A1 | 2/2010 |
| EP | 2193395 A1 | 6/2010 |
| EP | 2255233 A1 | 12/2010 |
| EP | 2333597 A2 | 6/2011 |
| EP | 2362253 A1 | 8/2011 |
| EP | 2401641 A1 | 1/2012 |
| EP | 2609458 A1 | 7/2013 |
| EP | 2622395 A1 | 8/2013 |
| EP | 2734879 A1 | 5/2014 |
| EP | 2815259 A1 | 12/2014 |

(56) References Cited

FOREIGN PATENT DOCUMENTS

| | | |
|---|---|---|
| EP | 2817667 A1 | 12/2014 |
| EP | 2992372 A1 | 3/2016 |
| EP | 3022596 A1 | 5/2016 |
| EP | 3064973 A2 | 9/2016 |
| EP | 3101740 A1 | 12/2016 |
| EP | 3245545 A1 | 11/2017 |
| EP | 3265859 A1 | 1/2018 |
| EP | 3336992 A1 | 6/2018 |
| EP | 3362830 A1 | 8/2018 |
| EP | 3427096 A1 | 1/2019 |
| EP | 3443395 A1 | 2/2019 |
| EP | 3535614 A1 | 9/2019 |
| EP | 3537197 A1 | 9/2019 |
| EP | 3646074 A1 | 5/2020 |
| EP | 3646079 A1 | 5/2020 |
| FR | 2485754 A1 | 12/1981 |
| JP | 61-145509 A | 7/1986 |
| JP | 63-078908 A | 4/1988 |
| JP | 63-089421 A | 4/1988 |
| JP | 03-063615 A | 3/1991 |
| JP | 03-207223 A | 9/1991 |
| JP | 05-297246 A | 11/1993 |
| JP | 06-320111 A | 11/1994 |
| JP | 07-318758 A | 12/1995 |
| JP | 08-292331 A | 11/1996 |
| JP | 09-135526 A | 5/1997 |
| JP | 09-325249 A | 12/1997 |
| JP | 10-339826 A | 12/1998 |
| JP | 11-064682 A | 3/1999 |
| JP | 11-281861 A | 10/1999 |
| JP | 11-326693 A | 11/1999 |
| JP | 2001-290051 A | 10/2001 |
| JP | 2003-121699 A | 4/2003 |
| JP | 2003-177279 A | 6/2003 |
| JP | 2005-031544 A | 2/2005 |
| JP | 2005-077591 A | 3/2005 |
| JP | 2005-520987 A | 7/2005 |
| JP | 2006-023502 A | 1/2006 |
| JP | 2006-259631 A | 9/2006 |
| JP | 2006-337637 A | 12/2006 |
| JP | 2007-078740 A | 3/2007 |
| JP | 2007-121859 A | 5/2007 |
| JP | 2009-265208 A | 11/2009 |
| JP | 2010-152084 A | 7/2010 |
| JP | 2011-033698 A | 2/2011 |
| JP | 2013-156580 A | 8/2013 |
| JP | 2014-085474 A | 5/2014 |
| JP | 2014-134746 A | 7/2014 |
| JP | 5537852 B2 | 7/2014 |
| JP | 5538328 B2 | 7/2014 |
| JP | 3207233 U | 11/2016 |
| KR | 10-2013-0081087 A | 7/2013 |
| NO | 2012/044741 A1 | 4/2012 |
| TW | 222688 B | 4/1994 |
| WO | 01/92927 A2 | 12/2001 |
| WO | 03/36358 A2 | 5/2003 |
| WO | 2004/061509 A1 | 7/2004 |
| WO | 2005/045494 A1 | 5/2005 |
| WO | 2006/009597 A1 | 1/2006 |
| WO | 2006/052420 A1 | 5/2006 |
| WO | 2006/113726 A1 | 10/2006 |
| WO | 2008/027201 A2 | 3/2008 |
| WO | 2008/150408 A1 | 12/2008 |
| WO | 2008/150423 A1 | 12/2008 |
| WO | 2009/042066 A1 | 4/2009 |
| WO | 2009/113819 A1 | 9/2009 |
| WO | 2009/117060 A1 | 9/2009 |
| WO | 2009/154990 A2 | 12/2009 |
| WO | 2010/092009 A1 | 8/2010 |
| WO | 2010/099141 A1 | 9/2010 |
| WO | 2011/044090 A2 | 4/2011 |
| WO | 2011/047111 A1 | 4/2011 |
| WO | 2012/027313 A1 | 3/2012 |
| WO | 2012/037727 A1 | 3/2012 |
| WO | 2012/163052 A1 | 12/2012 |
| WO | 2013/016042 A1 | 1/2013 |
| WO | 2013/122752 A1 | 8/2013 |
| WO | 2013/126488 A1 | 8/2013 |
| WO | 2014/151259 A1 | 9/2014 |
| WO | 2014/167447 A1 | 10/2014 |
| WO | 2014/179411 A1 | 11/2014 |
| WO | 2014/197894 A1 | 12/2014 |
| WO | 2015/144883 A1 | 10/2015 |
| WO | 2015/047508 A1 | 12/2015 |
| WO | 2015/197588 A1 | 12/2015 |
| WO | 2016/059320 A1 | 4/2016 |
| WO | 2016/073862 A2 | 5/2016 |
| WO | 2016/095213 A1 | 6/2016 |
| WO | 2016/100078 A1 | 6/2016 |
| WO | 2016/115288 A1 | 7/2016 |
| WO | 2016/156610 A1 | 10/2016 |
| WO | 2016/168389 A1 | 10/2016 |
| WO | 2017/063107 A1 | 4/2017 |
| WO | 2017/146722 A1 | 8/2017 |
| WO | 2017/155754 A1 | 9/2017 |
| WO | 2017/178920 A1 | 10/2017 |
| WO | 2018/083561 A1 | 5/2018 |
| WO | 2018/175123 A1 | 9/2018 |
| WO | 2018/204864 A1 | 11/2018 |
| WO | 2019/005190 A2 | 1/2019 |
| WO | 2019/005191 A1 | 1/2019 |
| WO | 2019/005192 A1 | 1/2019 |
| WO | 2019/005193 A1 | 1/2019 |
| WO | 2019/005194 A1 | 1/2019 |
| WO | 2019/005195 A1 | 1/2019 |
| WO | 2019/005196 A1 | 1/2019 |
| WO | 2019/005197 A1 | 1/2019 |
| WO | 2019/005198 A1 | 1/2019 |
| WO | 2019/005199 A1 | 1/2019 |
| WO | 2019/005200 A1 | 1/2019 |
| WO | 2019/005201 A1 | 1/2019 |
| WO | 2019/005202 A1 | 1/2019 |
| WO | 2019/005203 A1 | 1/2019 |
| WO | 2019/005204 A1 | 1/2019 |
| WO | 2019/036339 A1 | 2/2019 |
| WO | 2019/126333 A1 | 6/2019 |
| WO | 2019/195652 A1 | 10/2019 |
| WO | 2020/018657 A1 | 1/2020 |
| WO | 2020/101850 A1 | 5/2020 |

OTHER PUBLICATIONS

Faulkner et al. "Optical networks for local lopp applications," J. Lightwave Technol.0733-8724 7(11), 17411751 (1989).

Liu et al., "Variable optical power splitters create new apps", Retrieved from: https://www.lightwaveonline.com/fttx/pon-systems/article/16648432/variable-optical-power-splitters-create-new-apps, 2005, 14 pages.

Ramanitra et al. "Optical access network using a self-latching variable splitter remotely powered through an optical fiber link," Optical Engineering 46(4) p. 45007-1-9, Apr. 2007.

Ratnam et al. "Burst switching using variable optical splitter based switches with wavelength conversion," ICIIS 2017—Poeceedings Jan. 2018, pp. 1-6.

Wang et al. "Opto-VLSI-based dynamic optical splitter," Electron. Lett.0013-5194 10.1049/el:20046715 40(22), 14451446 (2004).

Xiao et al. "1 xN wavelength selective adaptive optical power splitter for wavelength-division-multiplexed passive optical networks," Optics & Laser Technology 68, pp. 160-164, May 2015.

* cited by examiner

FIBER OPTIC TERMINALS AND TOOLS AND METHODS FOR ADJUSTING A SPLIT RATIO OF A FIBER OPTIC TERMINAL

CROSS REFERENCE TO RELATED APPLICATIONS

This application claims the benefit of priority of U.S. Provisional Application Ser. No. 63/193,186 filed on May 26, 2021, the content of which is relied upon and incorporated herein by reference in its entirety.

FIELD

The disclosure is directed to fiber optic terminals having variable ratio couplers and tools for changing the output power level of optical outputs along with fiber optic networks using the terminals.

BACKGROUND

Optical fiber is increasingly being used for a variety of applications, including but not limited to broadband voice, video, and data transmission. As bandwidth demands increase optical fiber is migrating deeper into communication networks such as in fiber to the premises applications such as FTTx, 5G and the like. As optical fiber extends deeper into communication networks there exists a need for building more complex and flexible fiber optic networks in a quick and easy manner.

Terminals such as multiports or closures were also developed for making one or more optical connections with hardened connectors such as the OptiTap® plug connector. Prior art multiports have an input cable or input port with a plurality of receptacles mounted through a wall of the housing for protecting an indoor connector inside the housing that makes an optical connection to the external hardened connector of the branch or drop cable.

Illustratively, FIG. 1 shows a conventional fiber optic multiport 1 having an input fiber optic cable 4 carrying one or more optical fibers to indoor-type connectors inside a housing 3. The multiport 1 receives the optical fibers into housing 3 and distributes the optical fibers to receptacles 7 for connection with a hardened connector. The receptacles 7 are separate assemblies attached through a wall of housing 3 of the multiport 1. The receptacles 7 allow mating with hardened connectors attached to drop or branching cables (not shown) such as drop cables for "fiber-to-the-home" applications. During use, optical signals pass through the branch cables, to and from the fiber optic cable 4 by way of the optical connections at the receptacles 7 of multiport 1. Fiber optic cable 4 may also be terminated with a fiber optic connector 5.

Multiport 1 allows quick and easy deployment by service providers for passive optical networks. Further, multiport 1 may use a coupler or splitter inside the multiport to allow a single input optical signal to be split into multiple output channels. By way of explanation, the input fiber optic cable may have a single optical fiber that is in optical communication with a 1:N splitter for outputting N output signals. However, the power level of the input optical channel is divided among the N output signals in a passive optical network (e.g., no active components are used in the passive portion of the optical network). By way of explanation, a 1:2 coupler may split the power from the single input optical fiber as 50% power for the first output optical signal and 50% power for the second output optical signal. Other couplers may have unequal splits in the power level as desired such as splitting the power from the single input optical fiber as 80% power for the first output optical signal and 20% power for the second output optical signal depending on the requirements for the fiber optic network. Furthermore, multiports may be daisy-chained together for building more complicated fiber optic networks with further power level splits for the distribution of passive optical signals. By way of a simple explanation, an input optical signal from the central office may be able to accommodate a total split of 1:16 for the given input power level of the optical signal. An upstream multiport may have a 1:2 split with equal power levels for the two output fibers that each feed separate downstream multiports having a further 1:8 split with equal power levels, thus the single input fiber is split into 16 output signals each having an equal power level. Alternatively, a single multiport can incorporate a 1×2 splitter with unequal power split, with one output connected to a 1×N equal power splitter and the other connected to a downstream multiport.

However, conventional couplers or splitters have a fixed power level split for the output signals. This requires many individual couplers or splitters each having its own SKU, which increases both manufacturing and inventory costs. Moreover, fixed power level split does not readily allow for easy modification to the fiber optic network due to changed circumstances such as adding new customers or adapting the power levels needed for different loss budgets across the length of the passive optical network.

Consequently, there exists an unresolved need for terminals that provide quick and easily deployment for the fiber optic network in a flexible manner while also addressing concerns related to limited space, organization, or aesthetics.

SUMMARY

The disclosure is directed to fiber optic terminals (hereinafter "terminals") and tools for adjusting a split ratio of fiber optic terminals including variable ratio couplers. The tools and the terminals with variable ratio couplers allow the power levels for the optical outputs from the variable ratio coupler to be changed as desired, thereby providing flexibility for the network operators to adapt or customize their network for their given needs.

In one embodiment, a tool for adjusting a split ratio of a fiber optic terminal includes an axle for insertion into a port of the fiber optic terminal, and a terminal engagement body disposed about the axle. The terminal engagement body includes a terminal engagement feature for engaging an alignment feature within the fiber optic terminal, wherein the axle is free to rotate with respect to the terminal engagement body, and a set-point indicator. The tool further includes an end piece coupled to the axle, and a plurality of set-point markers, wherein rotation of the end piece causes rotation of the axle and an alignment of one set-point marker of the plurality of set-point markers with the set-point indicator indicates the split ratio of the fiber optic terminal.

In another embodiment, a tool for adjusting a split ratio of a fiber optic terminal includes a housing defining a cavity, an input axle at least partially disposed within the cavity, an indicator body coupled to an end of the input axle that includes a plurality of set-point markers that are visible through the housing, and a terminal engagement feature disposed within the housing and operable to be referenced and attached to a fiber optic terminal, wherein the terminal engagement feature includes a set-point indicator that is visible through the housing. The tool further includes a first set of gears disposed on the input axle, wherein each gear of the first set of gears has a different diameter and an adjustment axle partially disposed within the cavity and including an adjustment end extending out of the cavity. The adjustment end is operable to be inserted into a port of the fiber optic terminal. The tool also includes a second set of gears disposed on the adjustment axle, wherein each gear of the second set of gears has a different diameter, and engagement of an individual gear of the first set of gears with an individual gear of the second set of gears depends on an insertion depth of the adjustment axle into the port.

In another embodiment, a tool for adjusting a split ratio of a fiber optic terminal includes a housing defining a cavity, an axle for insertion into a port of a fiber optic terminal, wherein the axle is partially disposed within the cavity, a terminal engagement body operable to reference with and attach to the fiber optic terminal, an actuator coupled to the axle, and an encoder coupled to the axle, wherein the encoder is operable to determine a rotational position of the axle. The tool further includes at least one controller that is programmed to receive calibration information having a location of set-points of a shaft of a variable ratio coupler within the fiber optic terminal, and provide a control signal to the actuator to rotate the axle to a desired set-point based at least in part on the calibration information and a position signal from the encoder.

In another embodiment, a fiber optic terminal includes a shell having a cavity, a plurality of ports including a control port having a port opening extending from an outer surface of the terminal into the cavity and defining a port passageway along a longitudinal axis, wherein the control port is operable to receive a tool, and a variable ratio coupler disposed within the cavity. The variable ratio coupler includes an optical input, a first optical output, a second optical output, and a shaft, wherein rotation of the shaft by the tool changes an output power level between the first optical output and the second optical output at a coupling region.

In another embodiment, a method of changing a split ratio of a fiber optic terminal includes inserting an axle of a tool into a control port passageway of a control port of a plurality of ports of the fiber optic terminal to engage an end of the axle with a shaft of a variable ratio coupler within a cavity of the fiber optic terminal. The method further includes rotating the axle of the tool to rotate the shaft of the variable ratio coupler to a desired set-point, wherein the desired set-point corresponds to a desired output power level between a first optical output and a second optical output of the variable ratio coupler.

In another embodiment, a variable ratio coupler for changing a split ratio of optical power for two optical fibers includes a coupler having a coupling region operable to change the split ratio of the optical power for the two optical fibers, and a shaft having an end, an end face at the end configured to receive a tool, and a plurality of detents circumferentially disposed about the end, wherein rotation of the shaft by the tool changes an output power level between the first optical output and the second optical output at a coupling region, and the plurality of detents correspond with a plurality of set-point indicators provided on the tool. The variable ratio coupler further includes a cam disposed on the shaft, wherein the cam has a shape that changes an amount of bend on the coupling region for a desired split ratio of optical power for the two optical fibers and provides for substantially equally spaced individual set-point indicators of the plurality of set-point indicators on the tool.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

DETAILED DESCRIPTION

Figure 1:
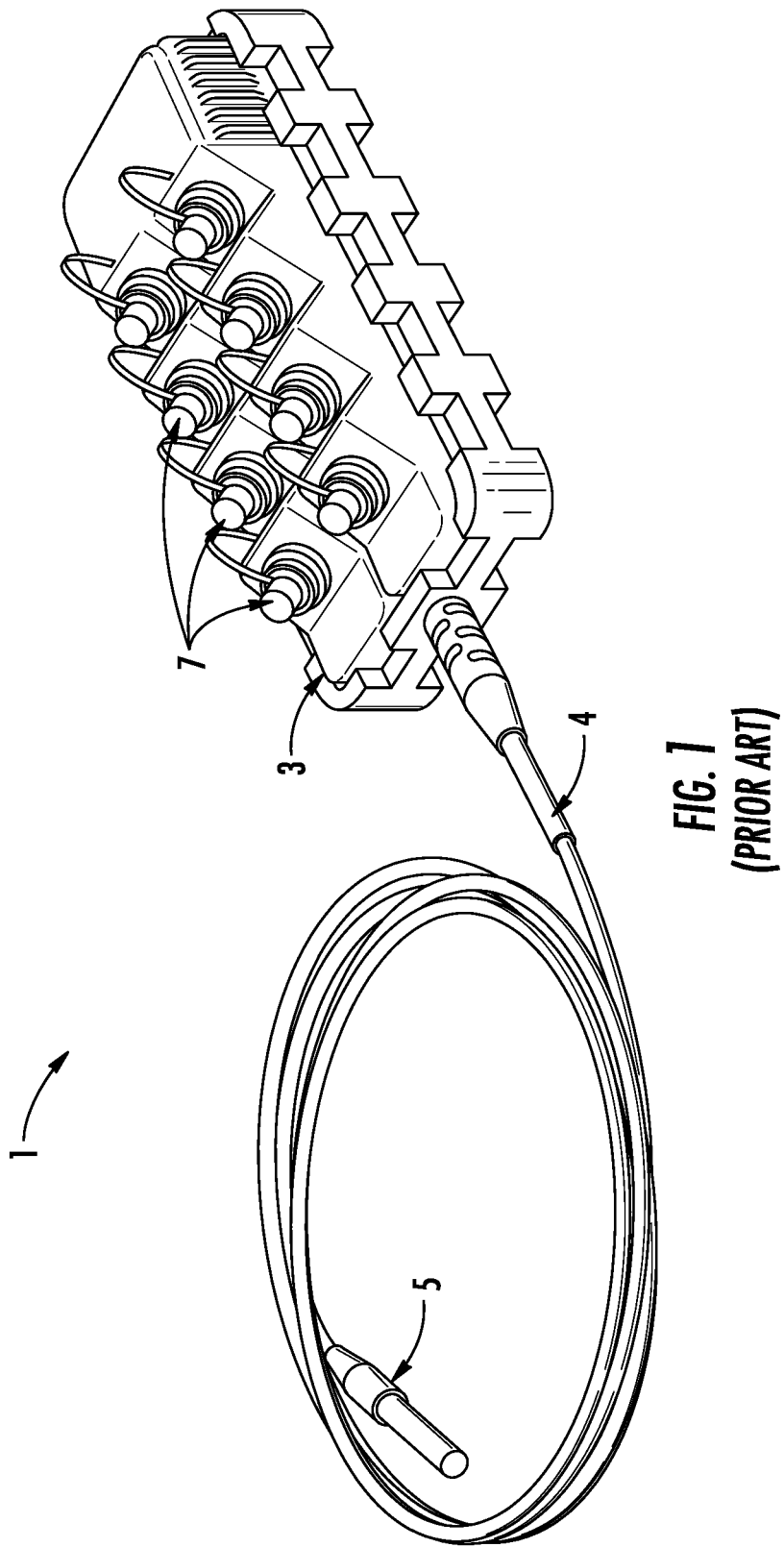
FIG. 1 is a prior art multiport.

References will now be made in detail to the embodiments of the disclosure, examples of which are illustrated in the accompanying drawings. Whenever possible, like reference numbers will be used to refer to like components or parts.

The concepts disclosed are related to fiber optic networks, tools and fiber optic terminals having at least one variable ratio coupler with shaft for actuation by a tool for changing an output power level between a first optical output and a second optical output for a passive optical network. As used herein, "variable ratio coupler" means that the output power level may be adjusted to many different power level splits (i.e., "split ratios") across the spectrum of output power levels so that the power level split may be tuned or changed by the user as desired in a passive operation that does not require power to be supplied to the module for its operation, and does not mean the power level may only be changed to two discrete power level splits. Consequently, the fiber optic terminals (hereinafter "terminals") comprising the variable ratio coupler(s) (hereinafter "VRC(s)") are well-suited for passive optical networks such as in the outside plant environment such as downstream from a central office location or the like, but other applications are possible.

In addition to the passive operation and providing a wide range of possible output power split levels, the concepts using the VRC disclosed provide a stable performance across varying conditions. Further, the terminals and networks using the VRC have a low polarization dependent loss (PDL). In other words, the polarization state of the optical signal does not adversely impact the performance of the terminals or networks. Thus, the polarization state of the optical signal is not a factor for performance or operation. By way of example, the PDL loss is about 0.5 dB or less, and may even be as low as 0.3 dB or less or 0.2 dB or less for any polarization state of the input optical signal.

Still further, terminals and networks using the VRC have a wide wavelength range for suitable performance. By way of example, the terminals and networks using VRC comprise a similar performance from about 1260 nm to about 1625 nm. Generally speaking, the terminals disclosed and explained in the exemplary embodiments are multiports, but the concepts disclosed may be used with any suitable terminal such as closures, network interface devices, wireless radios or the like having at least one variable ratio coupler with a control for changing an output power level.

The concepts disclosed advantageously provide flexibility for the network operators and also reduce manufacturing complexity and inventory concerns for manufacturers of the terminals along with network operators since the need to manufacture and stock a multitude of terminals having different fixed power split levels is not necessary. In other words, the terminals and fiber optic networks disclosed may be adjusted to have the desired power level splits at any point during their lifetime, thereby providing flexibility and adaptability to alter the fiber optic network based on moves, adds or changes to the fiber optic network. The concepts may be used with any suitable terminals and may be especially advantageous with terminals having compact form-factors. The concepts are scalable to any suitable count of input or outputs on a terminal in a variety of arrangements or constructions for building fiber optic networks.

For instance, the concepts disclosed herein are suitable for fiber optic networks such as for Fiber-to-the-Home and 5G applications and are equally applicable to other optical applications as well including indoor, industrial, wireless, or other suitable applications. The concepts disclosed herein are especially advantageous for asymmetric split fiber optic networks (e.g., fiber optic networks having one VRC with an unequal output power level split). Additionally, the concepts disclosed may be used with terminals having any suitable footprint or construction.

Although VRC fiber optic terminals are desirable, providing the mechanisms to adjust the split ratio of the VRC in each fiber optic terminal may undesirably increase the cost of the fiber optic terminal. For example, more parts need to be fabricated and incorporated into the fiber optic terminal, thus increasing its cost of manufacture. Embodiments of the present disclosure reduce the overall cost to manufacture a fiber optic terminal having a VRC by including at least some of the mechanics for adjusting the split ratio of VRCs into a separate tool. Thus, a single tool may be used to adjust the split ratio of many fiber optic terminals. For example, the set-point display may be incorporated into the tool itself, as well as the mechanical means to adjust a coupling region of the VRC.

The embodiments described herein also enable a manufacturer of telecommunications equipment to replace multiple SKUs, each representing a terminal with a non-variable coupler with a fixed tap ratio, with a single SKU number for the fiber optic terminal having a VRC. This further reduces the costs to manufacture, purchase and manage fiber optic terminals incorporating couplers.

Various designs, constructions, or features for fiber optic networks, tools and terminals are disclosed in more detail as discussed herein and may be modified or varied as desired.

Figure 2:
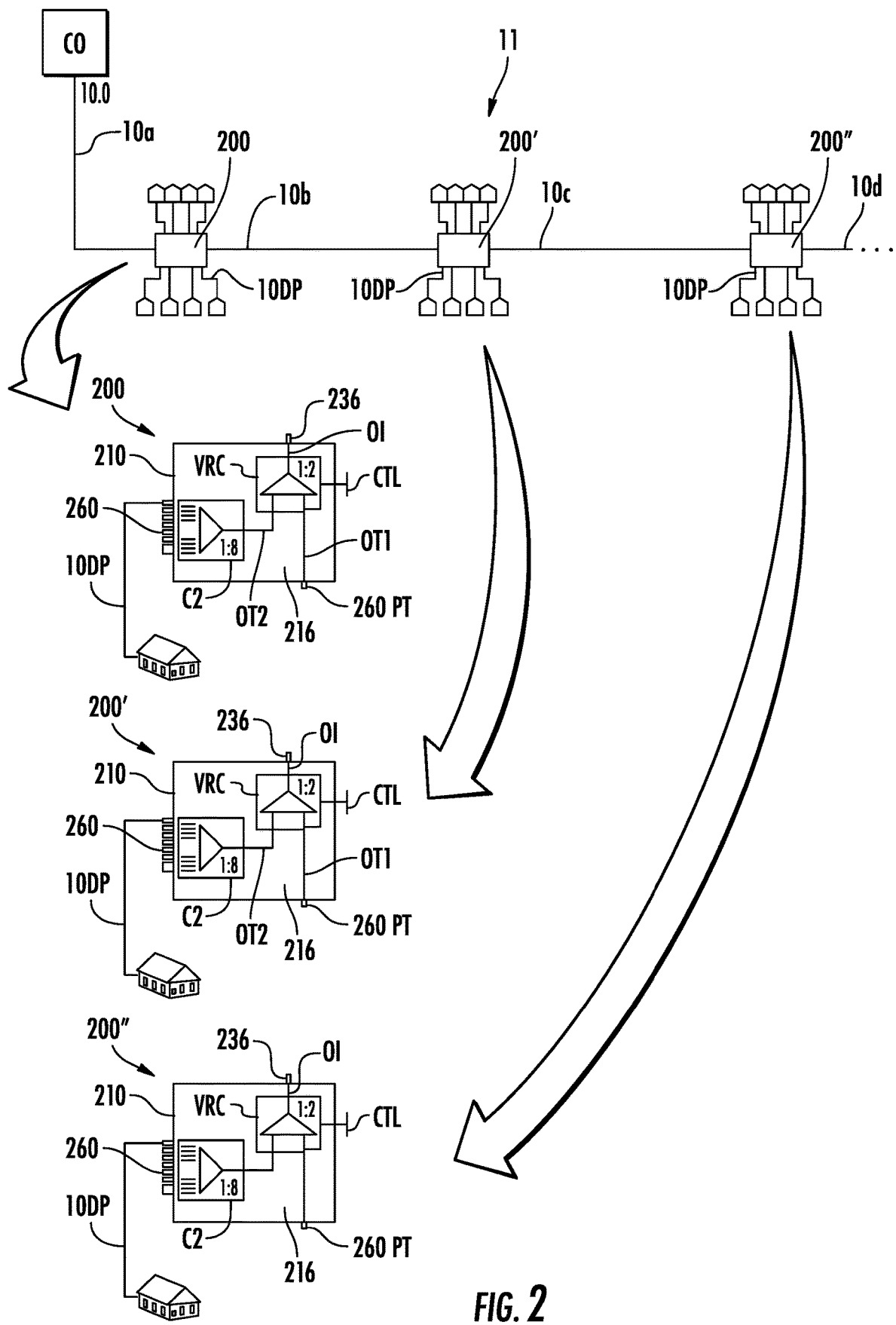
FIG. 2 is a schematic representation of a fiber optic network having terminals with a variable ratio coupler.

FIG. 2 shows a schematic view of an explanatory fiber optic network 11 such as for a passive fiber-to-the-home (FTTH) network comprising a first terminal 200 having a VRC; however, the concepts may be used with other networks such as a PON, FTTx or 5G networks. As depicted, a first optical link 10a (e.g., a first fiber optic cable) is an input optical link connected to a central office CO at a first end and a second end is in optical communication with the optical input OI of the first terminal 200. A first end of a second optical link 10b (e.g., a second optical cable) is an output optical link of terminal 200 and is in optical communication with the first optical output (OT1) of the terminal 200 as depicted. A second end of the second optical link 10b is in optical communication with the optical input OI of a second terminal 200'. A first end of a third optical link 10c (e.g., a third optical cable) is an output optical link of terminal 200' and is in optical communication with the first optical output (OT1) of the terminal 200' as depicted. A second end of the third optical link 10c feeds into the optical input OI of a third terminal 200". A first end of a fourth optical link 10d (e.g., a fourth optical cable) is an output optical link of terminal 200". The fiber optic network 11 splits the power level launched from the CO at the respective terminals 200, 200' and 200" for the distribution of optical signals to the fiber optic network 11.

Terminals 200, 200' and 200" are schematically depicted in FIG. 2 each of which comprises a shell 210 having a cavity 216 with a portion of the respective VRCs being disposed within the respective cavities 216. The terminals 200, 200' and 200" also comprise at least one input connection port 236, and a plurality of ports 260. The VRCs each also comprise the optical input (OI), the first optical output (OT1), the second optical output (OT2) and a control (CTL) for changing an output power level between the first optical output (OT1) and the second optical output (OT2) as depicted. The input connection port 236 may comprise a port opening 238 extending from an outer surface (234) of the terminal 200 into the cavity 216 and defines a port passageway 233 along a longitudinal axis. In this embodiment, terminals 200, 200' and 200" of fiber optic network 11 comprise the same configuration as depicted; however, the VRCs are adjusted with different output power level split between the respective first optical output (OT1) and second optical output (OT2) using the control (CTL). As described in more detail below, the control (CTL) may be adjusted using a tool, and further the control (CTL) may be provided within one of the optical ports of the terminal 200, 200', 200". The output power level split for the VRC may be asymmetric or not depending on the desired output power levels.

By way of explanation, fiber optic network 11 distributes the signal from the second optical output (OT2) from the respective VRCs to each local neighborhood where the bandwidth of the optical output is shared by multiple subscribers. For instance, terminal 200 may have its VRC adjusted to a 90/10 split of the power received from the central office (CO) (minus losses) with 90% of the input power being directed to the first optical output (OT1) and 10% of the input power being directed to the second optical output (OT2) for the distribution of optical signals to its local neighborhood. Thereafter, terminal 200' receives 90% of the power transmitted to its optical input (OI) (minus losses such as connector losses, transmission losses, etc.), and may have its VRC adjusted to a 75/25 split of the power received at its optical input (OI) with 75% of the input power to terminal 200' being directed to its first optical output (OT1) and 25% of the input power being directed to its second optical output (OT2) for the distribution of optical signals to its local neighborhood. Terminal 200" that receives 75% of the power from the optical output (OT1) of terminal 200' at the optical input (OI) may have its VRC adjusted to a 50/50 split of the power received with 50% of the input power being directed to the first optical input (OT1) and 50% of the input power being directed to the second optical output (OT2) for the distribution of optical signals to its local neighborhood. This representative fiber optic network 11 allows the desired power levels to be transmitted to the local neighborhoods, while transmitting the remaining power downstream in the fiber optic network 11 as desired. Moreover, the output power level split ratios within the terminals 200, 200' and 200" may be easily and quickly adjusted by the network operator as needed for moves, adds or changes in the fiber optic network 11 as desired, thereby providing flexibility and adaptability that is lacking in conventional fiber optic networks.

Figure 3:
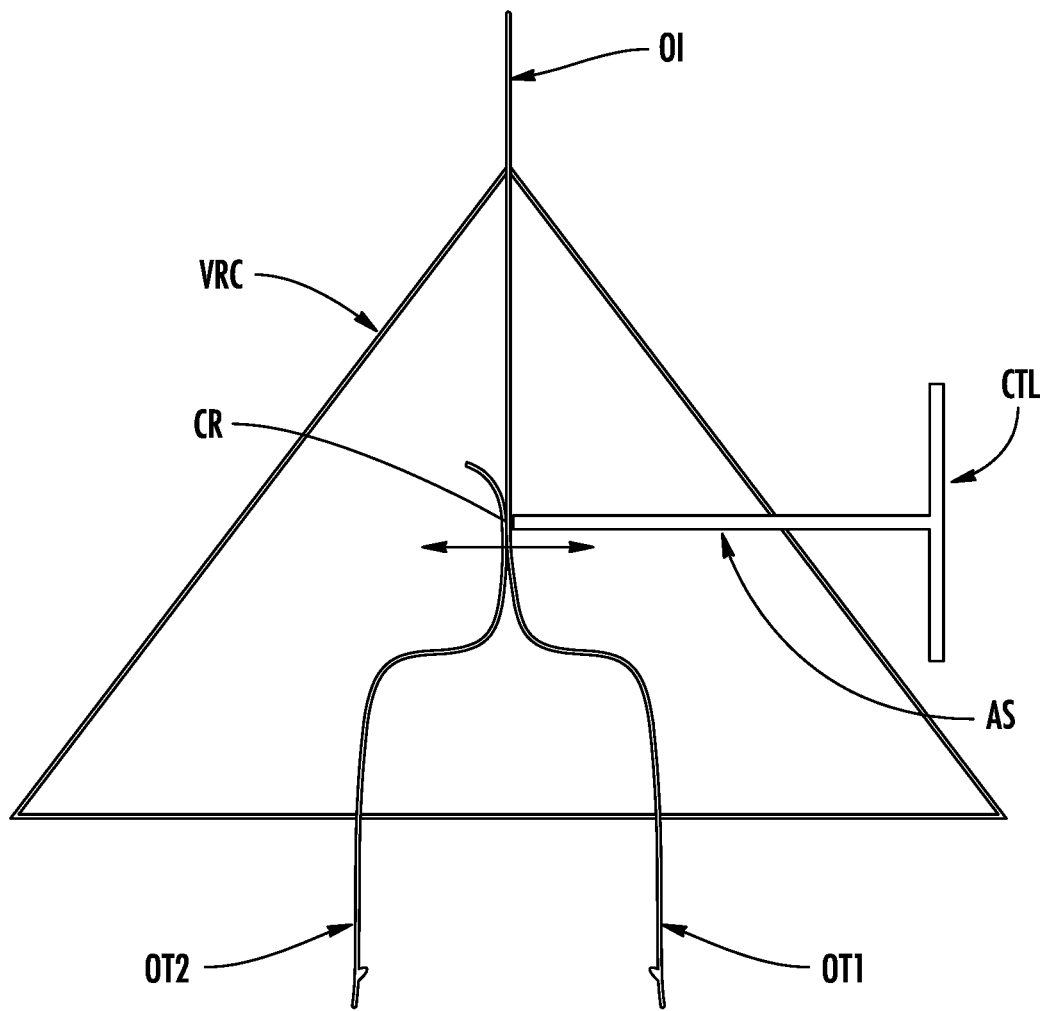
FIG. 3 is a schematic representation of the variable ratio coupler depicted in the terminals of FIG. 2.

FIG. 3 is a schematic representation of the VRC depicted in terminals 200, 200' and 200". As depicted, VRC comprises an optical input (OI) that has its output power level split between the first optical output (OT1) and the second optical output (OT2) at a coupling region (CR), with the control (CTL) for changing the output power level between the first and second outputs (OT1,OT2). The coupler may be a planar lightwave circuit (PLC) or multiclad coupler (MC) as known in the art, but other suitable structures may be used. The optical input (OI) and the optical outputs (OT1, OT2) are optical waveguides such as optical fibers that may be in optical communication with the respective input and outputs of the planar lightwave circuit or other type of device. Control (CTL) may be actuated (e.g., by use of a tool) for changing the output power level between the first optical output (OT1) and the second optical output (OT2) by any suitable means at the coupling region (CR).

The coupling region (CR) is the region where a portion of the first optical waveguide of the first optical output (OT1) and a portion of the second optical waveguide of the second optical output (OT2) are in optical (e.g., intimate) contact for allowing the changing of the output power level of the optical signals transmitted by the first optical output (OT1) and the second optical output (OT2). More specifically, the control (CTL) is configured for individually moving a portion of the first optical waveguide of the first optical output (OT1) (or alternatively moving a portion of the second optical waveguide of the second optical output (OT2)) at the coupling region (CR) as represented by the horizontal line with the arrows on the ends. The individual movement of the first or second optical waveguide with the control (CTL) may bend, deflect or change the geometry between the portion of the first optical waveguide of the first optical output (OT1) and the portion of the second optical waveguide of the second optical output (OT2) at the coupling region (CR) (i.e., an amount of deflection of the coupling region) for changing the output power level of the optical signals transmitted by the first optical output (OT1) and the second optical output (OT2). In further embodiments, the portion of the first optical waveguide and the portion of the second optical waveguide are fused together at the coupling region (CR) and the coupling ratio may be changed, for example, by bending the fused region. Other constructions are possible for the coupling region (CR) for changing the output power level of the optical signals transmitted by the first optical output (OT1) and the second optical output (OT2). For instance, other embodiments may change the index of refraction of the materials in or around the coupling region (CR). It should be understood that embodiments described herein are not limited by the method of changing the coupling ratio, such as those described in U.S. Pat. No. 7,627,214, for example.

Figure 4:
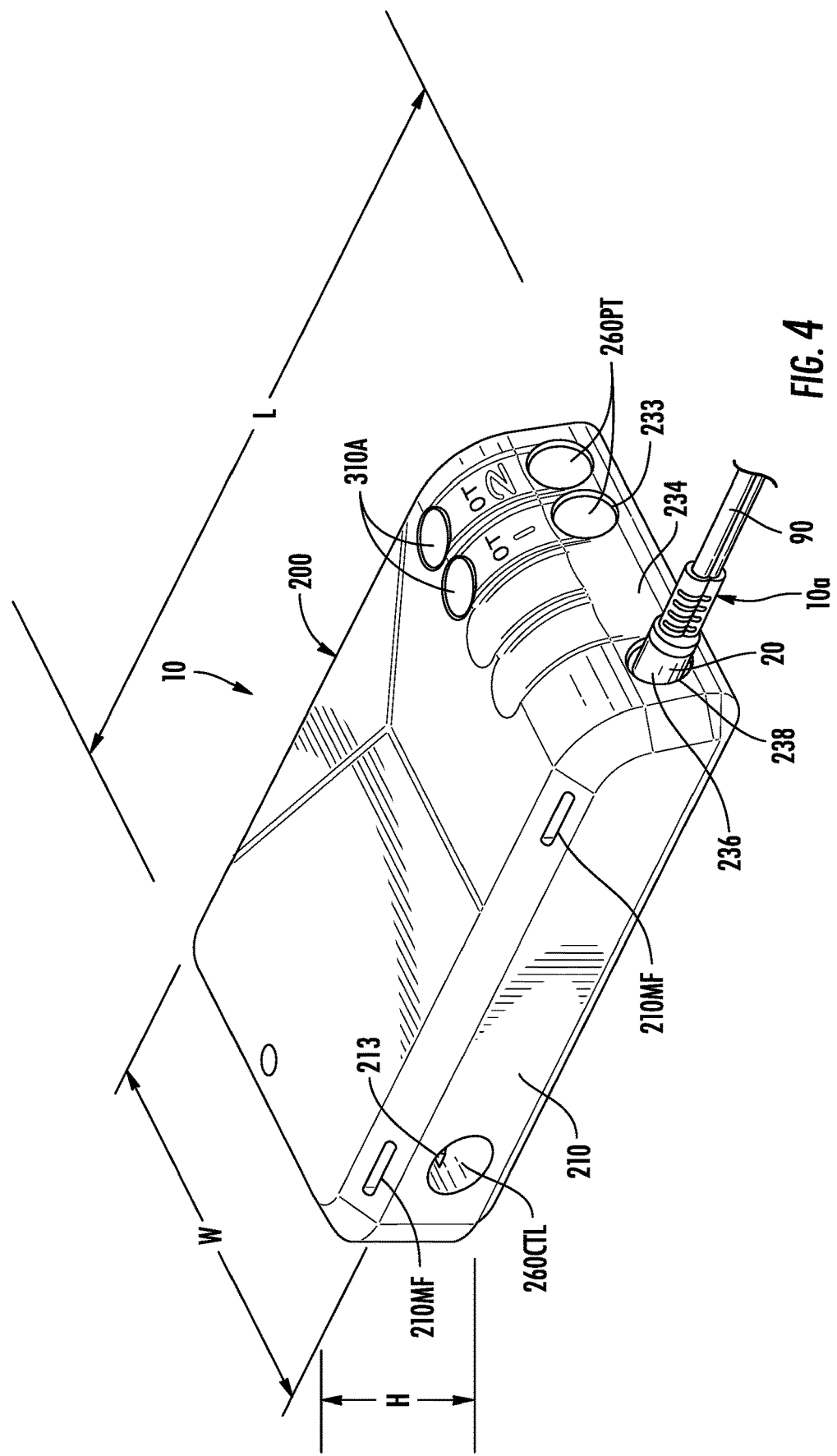
FIG. 4 is a perspective view of an explanatory fiber optic terminal comprising a variable ratio coupler disposed within a cavity of the terminal with a control port for receiving a tool for changing an output power level between a first optical output and a second optical output.
Figure 5:
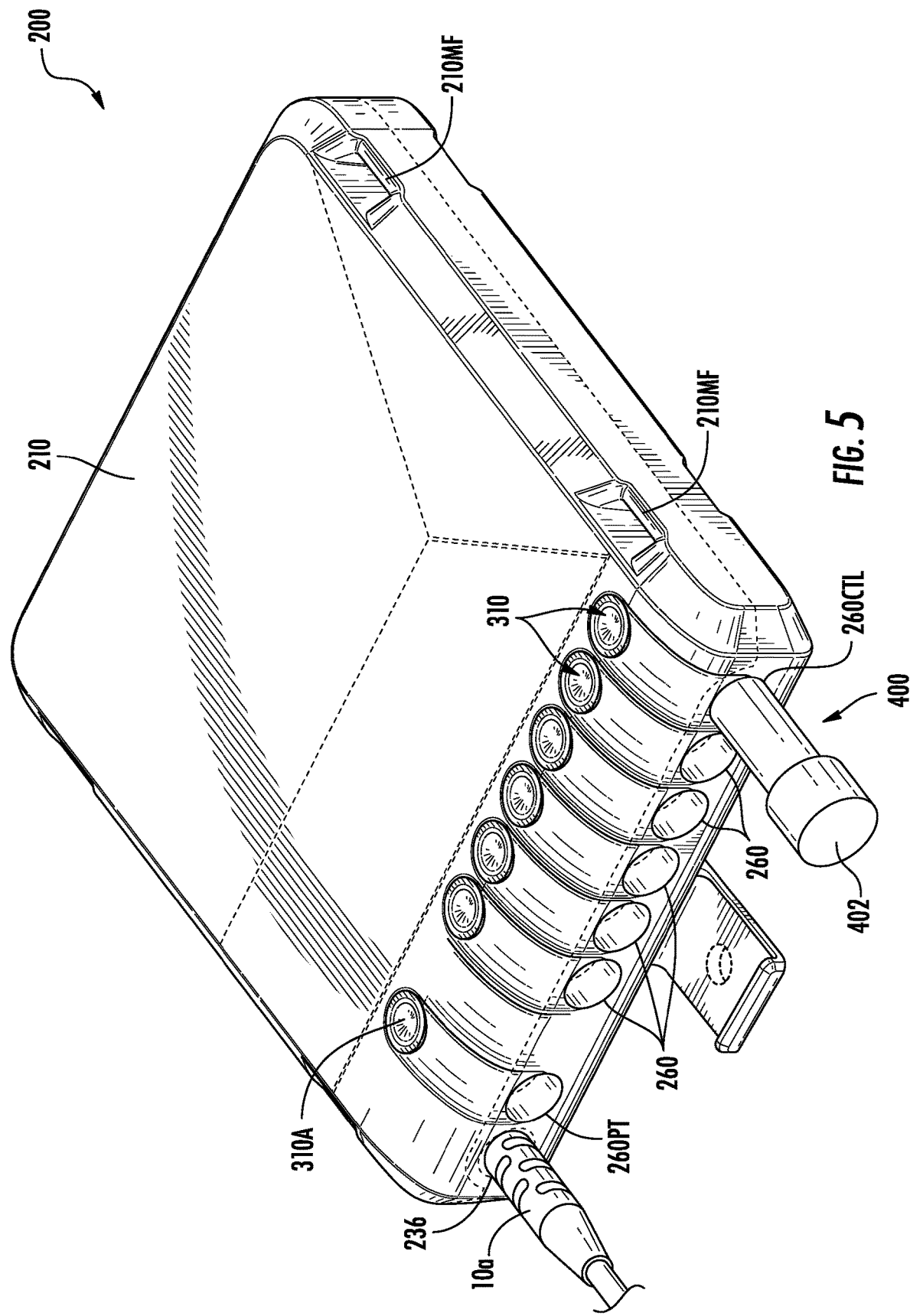
FIG. 5 is a perspective view of another explanatory fiber optic terminal similar to the fiber optic terminal of FIG. 4, but comprising a variable ratio coupler controllable by a tool and with a different number of output connection ports.
Figure 6:
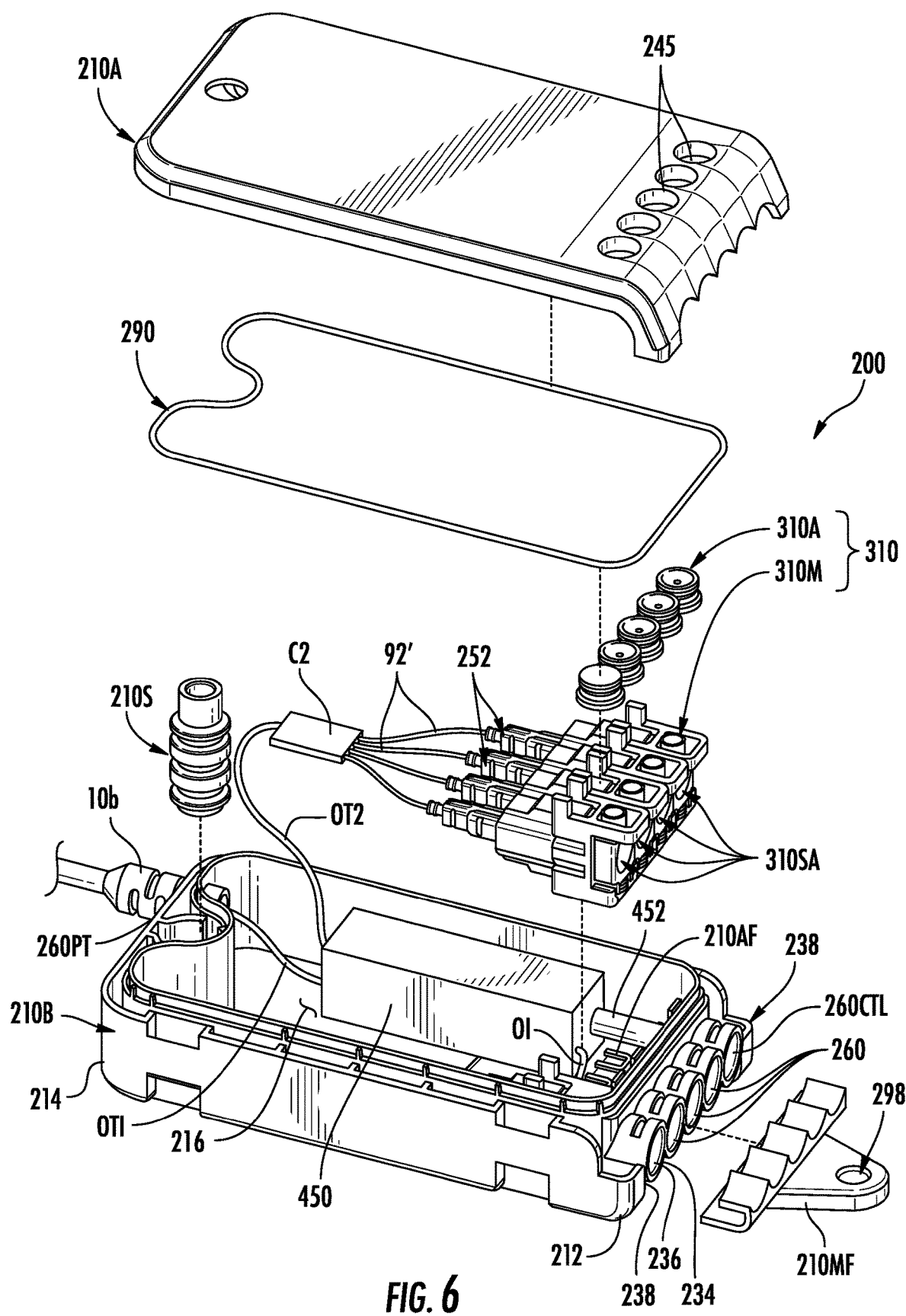
FIG. 6 is a partially exploded view of another explanatory terminal showing further details of a specific construction for terminals.

Explanatory terminals 200 are depicted in FIGS. 4-6 comprising a VRC having a portion disposed within a cavity 216 of shell 210 with a control (CTL) provided through a port. FIG. 4 depicts terminal 200 comprising at least one input connection port 236 and at least one pass-through output connection port 260PT to the right of input connection port 236. This terminal 200 comprises two pass-through output connection ports 260PT as shown for the first optical output (OT1) and the second optical output (OT2). Input connection port 236 and pass-through output connection ports 260PT are suitable for receiving respective external fiber optic connectors 100 of the optical link 10.

In the embodiment of FIG. 4, the shell 210 includes a control port 260CTL for receiving a tool to adjust the VRC within the shell. Various control ports 260CTL and VRCs are described in detail below.

FIG. 5 depicts another explanatory terminal 200 that comprises at least one input connection port 236 and a pass-through connection port 260PT. In this construction, the terminal 200 comprises an optical link 10a configured as a fiber optic cable that is secured to the input connection port 236 as a tether cable and optically connected to the optical input (OI) of the VRC. In other words, the fiber optic cable is not intended to be removable from the input connection port 236. The other end of the tether cable may be terminated with a suitable fiber optic for optical connectivity to the fiber optic network.

On the other hand, the pass-through connection port 260PT of terminal 200 of FIG. 5 is in optical communication with the first optical output (OT1) of the VRC. Terminal 200 of FIG. 5 also comprises a second coupler (C2) in optical communication with the second optical output (OT2) of the VRC such as schematically depicted in FIG. 2. The second optical coupler (C2) comprises a plurality of second coupler outputs (C201-C20x), and the second coupler outputs (C201-C20x) are in optical communication with a plurality of optical connection ports 260. More specifically, the second coupler outputs may comprise optical fibers extending from a PLC that are optically connected or terminated with respective fiber optic connectors 252 disposed within the cavity 216 of the terminal and are aligned with the respective port 260 for optical connection with the terminal 200. Terminal 200 of FIG. 5 comprises six output connection ports 260, but terminals 200 may use any suitable number of output connection ports as desired. The output connection ports 260 may be optically connected to drop cables having a suitable connector for routing the optical signals toward the subscribers.

In the embodiment of FIG. 5, the control port 260CTL is provided as an optical port opening such that it is within an array of output connection ports 260. Such a placement for the 260CTL may be advantageous because special shells do not need to be molded specifically for terminals including a VRC. Thus, one SKU number may be provided for shells intended for variable split ratio terminals and for shells intended for fixed split ratio terminals. As described in more detail below, the split ratio of the terminal 200 is adjusted by inserting a tool into the control port 260CTL. Another advantage of the embodiment shown by FIG. 5 is that the same plugs can be used for the control port 260CTL as the output connection ports 260.

In further explanation the terminal 200 of FIGS. 4-6 comprises a shell 210 with a cavity 216 along with a securing feature 310 comprising a securing member 310M associated with the port passageway 233 (FIG. 4). The input connection port 236, and pass-through connection ports 260PT each comprise a port opening extending from an outer surface of the terminal 200 into the cavity 216 of the terminal 200 and each port respectively defines a port passageway along a longitudinal axis. Each port 236, 260PT has a respective securing member 310M associated with the port. Each securing member 310M comprises a bore 310B suitable for receiving and securing a portion of the housing 20 of the fiber optic connector of the respective optical link such as depicted with the input optical link 10a inserted into the input connection port 236. Likewise, the output connection ports 260 where used may have a similar construction as described for the input connection port 236 and pass-through connection ports 260PT. Terminals 200 may also advantageously use the securing members 310M for releasably connecting the external fiber optic connectors 100 of the optical links in the respective connection ports using an actuator 310A of securing feature 310.

As stated above, the split ratio provided by a variable ratio coupler within the terminal is adjusted by a tool that is inserted into the cavity 216 of the shell 210. FIG. 6 illustrates a VRC 450 within the cavity 216 according to one embodiment. The VRC 450 is accessible by a control port 260CTL that is configured as an output port and is in an array of output ports 260. The control port 260CTL is defined by a passageway extending from an edge of the shell 210 into the cavity. As described in more detail below, the control port 260CTL is operable to receive a tool that engages a shaft 452. FIG. 5 illustrates an example tool 400 positioned in a control port 260CTL. Rotation of the tool 400 causes rotation of the shaft 452, which in turn causes the coupling region within the VRC 450 to bend. The bending of the coupling region changes the output power level of optical outputs OT1 and OT2 and thus changes the split ratio between optical outputs OT1 and OT2.

FIG. 5 illustrates a tool 400 inserted into a control port 260CTL. Particularly, the tool 400 comprises an axle 402 and an end piece, which is configured as a knob 401 in the illustrated embodiment. The user inserts the axle 402 into the passageway of the control port 260CTL until it engages the VRC. The user then applies a rotational force to the knob 401, which rotates the axle 402 and a shaft of the VRC to change the split ratio as described in more detail below.

Figure 7:
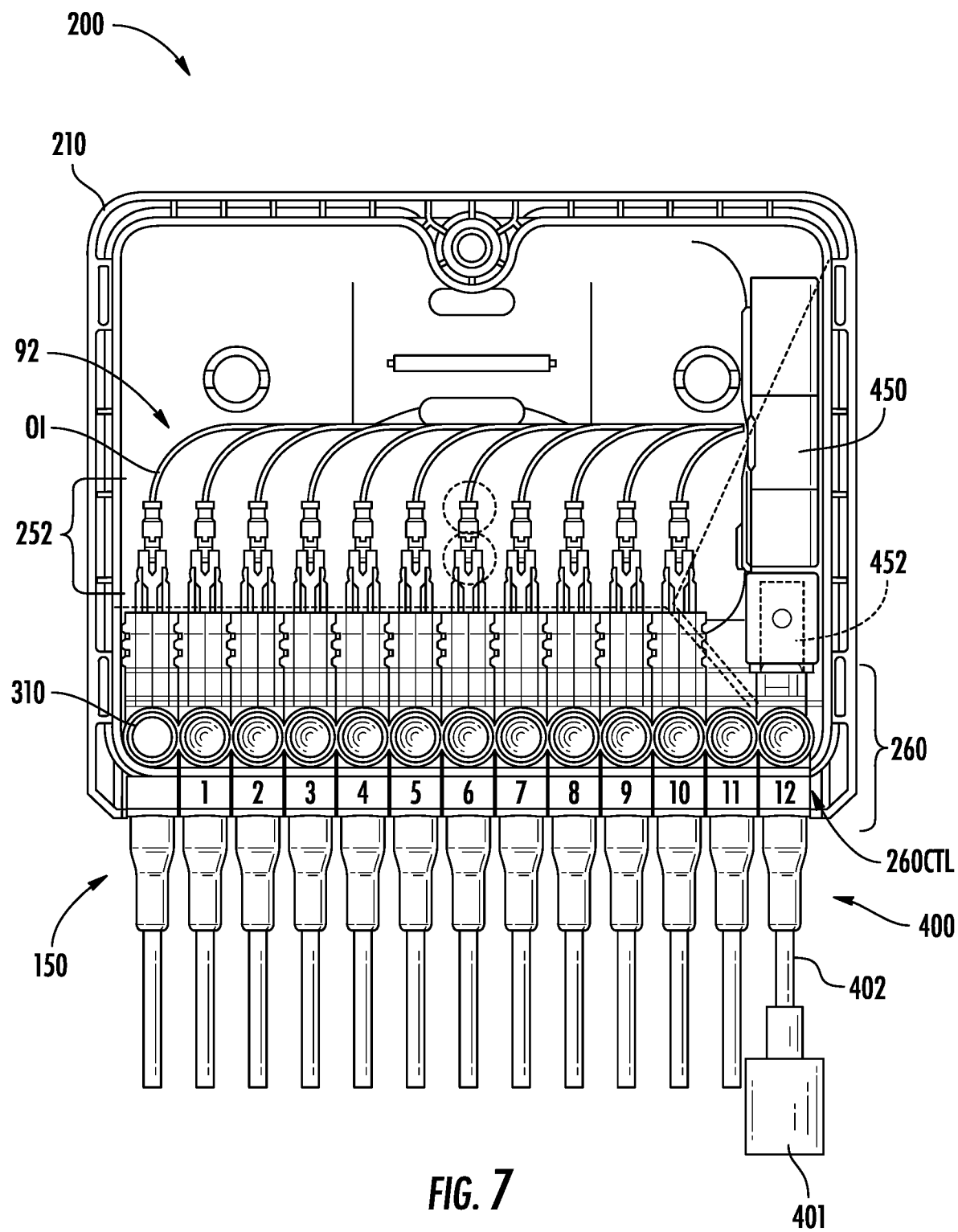
FIG. 7 is a transparent top view of another explanatory terminal showing further details of a specific construction for terminals.

FIG. 7 illustrates a partially transparent top view of a terminal 200 showing internal components of the terminal 200. Rather than a rear connector 252 at port #12, the terminal includes a VRC 450 at port #12. When inserted into the control port 260CTL (i.e., port 12), the tool 400 engages the VRC 450 and enables the user to change the split ratio of the terminal 200 accordingly.

Figure 8:
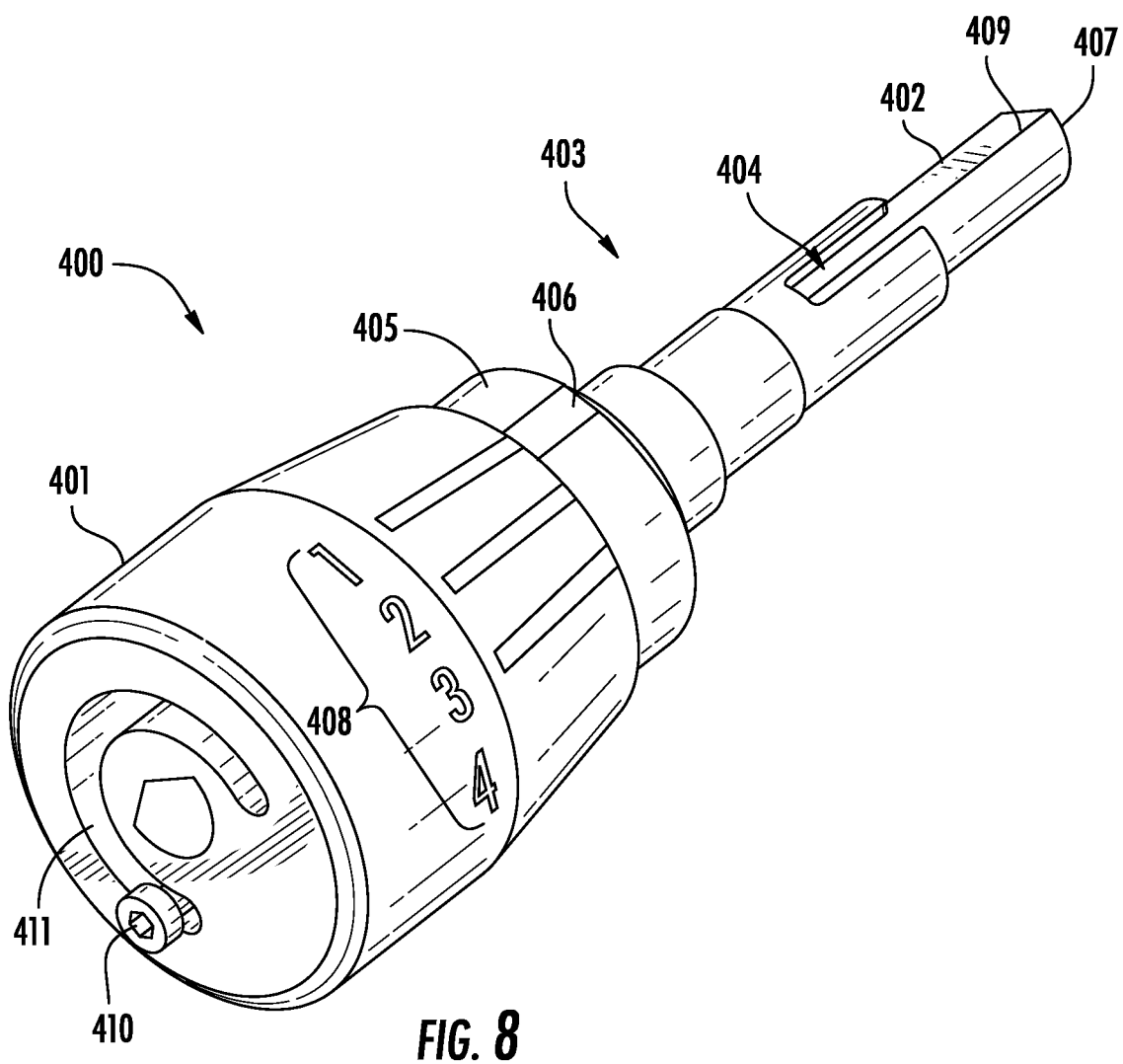
FIG. 8 is a perspective view of an explanatory tool for changing an output power level between a first optical output and a second optical output.

FIG. 8 illustrates a non-limiting example of a tool 400 for adjusting a split ratio of a terminal 200. The example tool 400 includes an axle 402 for insertion into a port (i.e., a control port 260CTL) of a fiber optic terminal. An end 407 of the axle 402 is rotationally asymmetric such that it is insertable into the VRC in only one rotational orientation. The phrase "rotationally asymmetric" means a component has only one rotational orientation with respect to another component. In the embodiment of FIG. 8, the end 407 includes a peak edge 409 such that the peak edge may only be inserted into a similarly shaped notch within the VRC.

The tool 400 further includes a terminal engagement body 403 disposed about the axle 402. The axle 402 is free to at least partially rotate about the terminal engagement body 403. The terminal engagement body 403 includes a terminal engagement feature 404 for engaging a corresponding alignment feature of the terminal 200. In the illustrated embodiment, the terminal engagement feature 404 is configured as a notch that is operable to engage an alignment feature configured as a protrusion, such as a ledge or a post. FIG. 4 illustrates an example alignment feature 213 configured as a ridge-like protrusion within the passageway defined by the control port 260CTL. Thus, the terminal engagement feature 404 and the alignment feature 213 cooperate to index the terminal engagement body 403 to a known position with respect to the terminal 200 and thus the VRC. It should be understood that other configurations for the terminal engagement feature 404 and the alignment feature 213 are possible.

Referring once again to FIG. 8 the terminal engagement feature 404 further comprises a set-point portion 405 that includes a set-point indicator 406. The set-point indicator 406 is referenced to the terminal engagement feature 404. As a non-limiting example, the set-point indicator 406 is aligned with the terminal engagement feature 404 along a longitudinal axis of the tool 400. The illustrated set-point indicator 406 is a ridge formed within the set-point portion 405. However, in other embodiments the set-point indicator 406 may be a marking, for example (e.g., an arrow, a line, a circle, etc.).

The tool 400 also includes an end piece configured as a knob 401 that is rigidly coupled to the axle 402. Rigidly coupled means that the knob 401 is not free to rotate with respect to the axle 402. The knob 401 has the function of providing a means for the user to rotate the tool 400 as well as providing a read-out of the current set-point of the terminal 200. Although FIG. 8 illustrates the end piece as a knob 401, embodiments are not limited thereto.

The knob 401 includes a plurality of set-point markers 408 that indicate which set-point (i.e., what split ratio) the terminal 200 is presently set at. In the illustrated embodiment, the set-point markers 408 comprise lines and associated numbers indicating the set-point. Embodiments are not limited to any particular marker for the set-point markers. For example, in another embodiment, the numbers may be replaced by the actual split ratio of the particular set point (e.g., 90/10, 75/25, and the like).

The terminal engagement body 403 is also free to rotate with respect to the knob 401 because the knob 401 is rigidly coupled to the axle. The knob 401 may be rotatably coupled to the terminal engagement body 403 by any manner. In the illustrated embodiment, the knob 401 includes an arcuate slot 411 extending from a face of the knob 401 into a passageway defined by the knob 401. An attachment feature 410 extends from an end face of the terminal engagement body 403 that is disposed within the passageway of the knob 401. The attachment feature 410 extends through the slot and prevents the knob 401 from being pulled away from the terminal engagement body 403. As a non-limiting example, a small screw may be applied to the attachment feature 410 after the attachment feature is positioned through the slot 411 to prevent the knob 401 from being separated from the terminal engagement body 403. The attachment feature 410 and the slot 411 prevent longitudinal movement of the knob 401 while allowing rotational movement of the knob 401 and axle 402 with respect to the terminal engagement body 403. Attachment feature 410 also provides limit on the rotational amount of knob 401 and said feature is not typically separable in normal use.

Upon insertion of the tool 400 into a control port 260CTL, the terminal engagement feature 404 engages the alignment feature 213 (FIG. 4) associated with the terminal 200. This orients the terminal engagement feature 404 to a proper and known position with respect to the terminal 200. Thus, the set-point indicator 206 is in a measurement position with respect to the terminal.

As the user continues to insert the tool 400 into the control port 260CTL, the end 407 of the axle 402 reaches a shaft 452 (FIG. 9) of the VRC. Because the end 407 of the axle 402 is rotationally asymmetric, it can only be inserted into the shaft 452 of the VRC in one rotational orientation. The user may need to rotate the knob 401 to find the proper orientation of the axle 402 with respect to the shaft 452. Once the axle 402 is properly seated in the shaft 452, the user may turn the knob 401, which also turns the axle 402 and the shaft 452, to align the desired set-point marker of the plurality of set-point markers 408 to the set-point indicator 406. It should be understood that all possible embodiments of the shaft 407 are not shown but the concept is to discourage tampering by using a shape which though available from vendors in the telecom space is not commonly available to members of the public.

Figure 9:
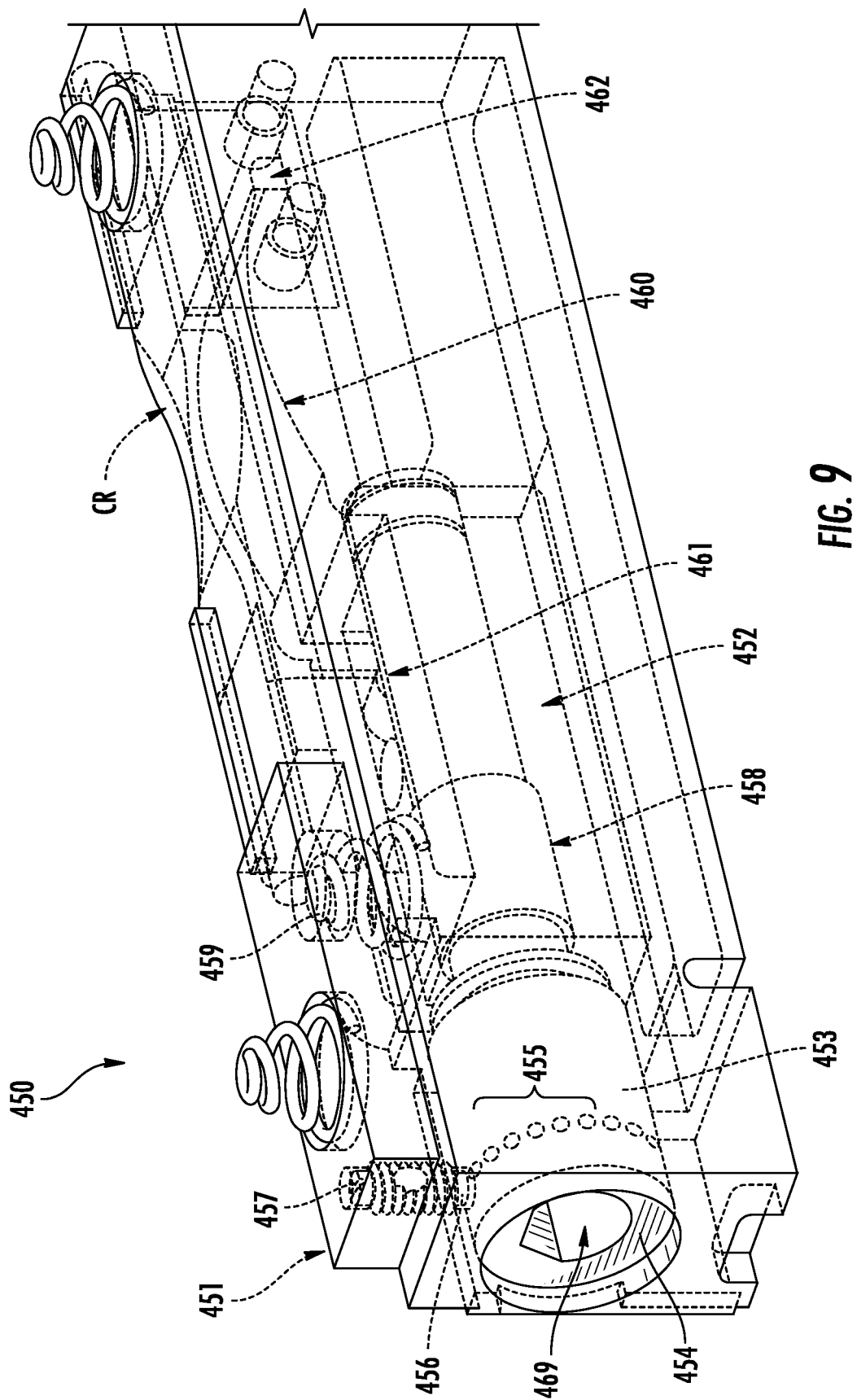
FIG. 9 is a perspective view of an explanatory variable ratio coupler for receiving a tool to change an output power level between a first optical output and a second optical output.

Referring now to FIG. 9, a non-limiting example of a VRC 450 is illustrated. The VRC 450 includes a housing 451 that defines a cavity in which the internal components are disposed. It should be understood that embodiments are not limited to the particular VRC 450 illustrated by FIG. 9, and that VRCs of the present disclosure may include different components or differently arranged components.

The VRC 450 includes a shaft 452 extending into the cavity defined by the housing 451. The shaft 452 includes an end face 454 that is accessible through an opening of the housing 451. The end face 454 is on a set-point portion 453 of the shaft 452. The shaft 452 further includes a cam 458, as described in more detail below. The shaft 452 further includes a rotationally asymmetric feature so that the axle 402 may be coupled to the shaft 452 in only one rotational position. In the illustrated embodiment, the rotationally asymmetric feature is a single hole 469 or opening that is rotationally asymmetric. The hole 469 is circular in shape but also includes a peak edge notch that is configured to receive a peak edge of the axle 402 in only one orientation. Embodiments are not limited to any particular rotationally asymmetric feature The VRC 450 further includes a flexure 460 that is held down on one side by a bias member 459 configured as a spring. The other side of the flexure 460 contacts a surface of the cam 458. An end 462 of the flexure 460 that is opposite from the end 461 that contacts the shaft 452 is rigidly coupled to the housing 451. An amount of bend on the coupling region (CR) imparted by the flexure 460 determines the amount of optical power that is provided to a first output OT1 and to a second output OT2 and thus determines the split ratio. The cam 458 is designed such that different positions on the surface of the cam 458 provide differing amounts of bend on the coupling region (CR).

The set-point portion 453 includes a plurality of detents 455 on its surface. Each detent corresponds to a particular set-point marker on the knob 401 and thus a specific set-point ratio (e.g., 90/10, 75/25 etc.). Thus, the plurality of detents 455 correspond to a plurality of set-points of the VRC 450. The VRC 450 further includes a plunger 456 that is biased toward the set-point portion 453 by a bias member 457, such as a coil spring. As the shaft 452 is turned by the tool 400, the plunger 456 is seated and then exits the detents 455. The plunger 456 and the detents 455 may provide haptic feedback to the user so that the user knows when the plunger 456 is properly seated in a detent 455 (e.g., a click or a vibration may be felt by the user through the tool 400 when the plunger 456 enters a detent 455). Further, it will require more force by the user to turn the knob 401 to cause the plunger 456 to exit the detent 455 as compared to when the plunger 456 is not present within a detent 455. In other words, a resistance to rotate the tool 400 is increased when the plunger 456 is within a detent 455 to move the plunger 456 out of the detent 455. Additionally, the placement of the plunger 456 within a detent 455 ensures that shaft 452 is locked at the desired rotational position and set-point.

The detents 455 may be fabricated on the shaft 452 using a calibration bench setup. For example, optical power may be input into the optical input and optical power sensors may be coupled to each of the fibers for the first output OT1 and the second output OT2. The shaft 452 is turned until the desired split ratio between the first output OT1 and the second output OT2 is achieved. A detent may be drilled or otherwise fabricated while the shaft is at this position for the desired set-point. The shaft may continue to be rotated until additional desired set-points are found and corresponding detents fabricated. This post-assembly fabrication of the detents allows variations in the performance of the coupler, its position in the package and the dimensions of the package to be accommodated.

Figure 10:
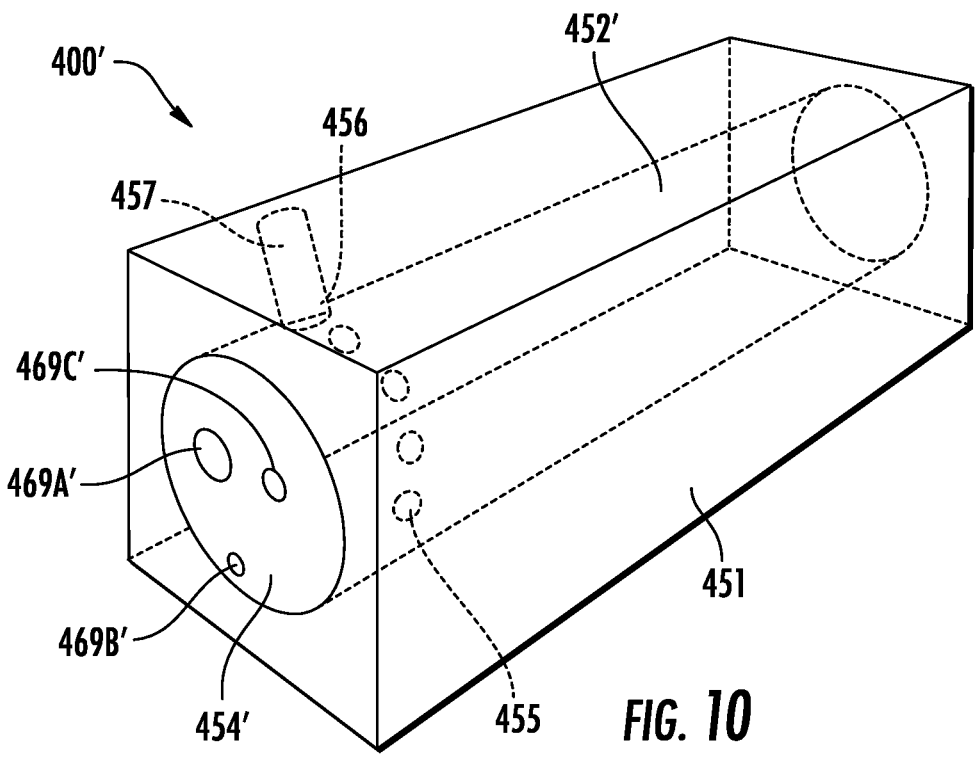
FIG. 10 is a perspective view of another explanatory variable ratio coupler for receiving a tool to change an output power level between a first optical output and a second optical output.

FIG. 10 illustrates portions of another VRC 400' having a shaft 452' with a different configuration for the rotationally asymmetric end face 454'. In this example, the rotationally asymmetric feature is defined by three holes 469A', 469B' and 469C' that are asymmetrically disposed about the end face 454'. The three holes 469A', 469B' and 469C' are configured to receive three prongs (see FIG. 14) in only one rotational orientation.

Figure 11:
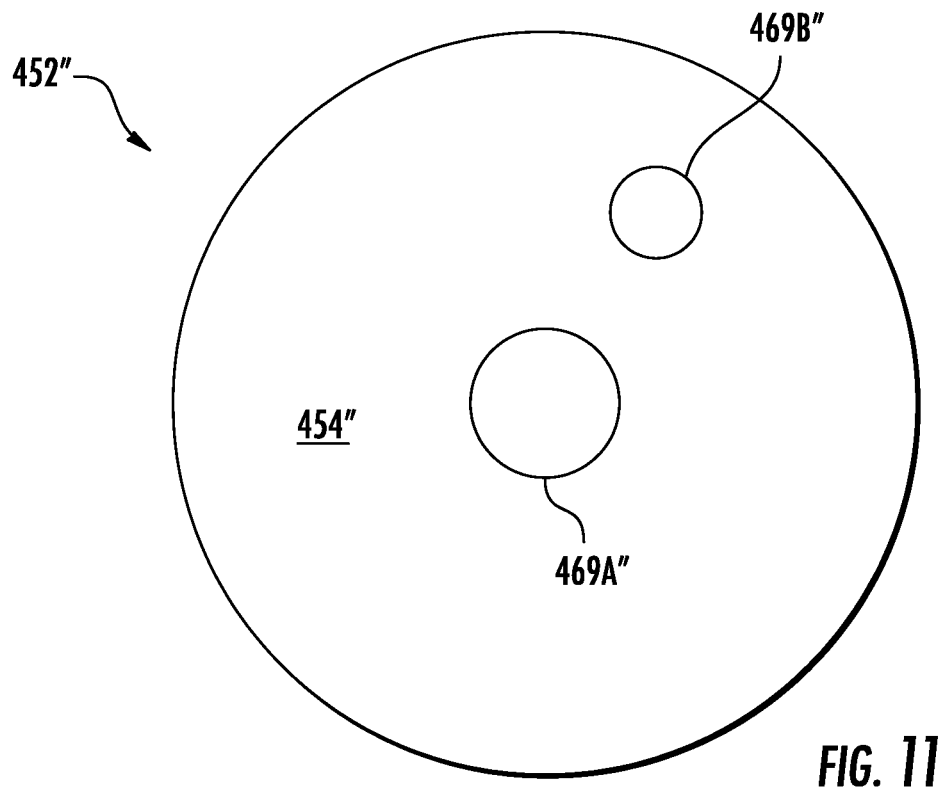
FIG. 11 is a front view of an explanatory shaft of a variable ratio coupler having a rotationally asymmetric feature configured as two holes in an end face of the shaft.

FIG. 11 illustrates another example end face 454" of a shaft 452" having two holes, a large central hole 469A" (i.e., a first hole) and a smaller outer hole 469B" (i.e., a second hole). The two holes define the rotationally asymmetric feature as a two-pronged axle can mate with the shaft 452" in only one rotational orientation. The outer hole 469B" can be machined into the end face after a set of detents has been drilled in a calibration stage. Thus, the azimuthal position of the hole 469B" can be chosen to make the rotational position of the tool axle 407 accommodate any part-to-part variation in the detent positions with respect to the cam shaft 452".

Embodiments are not limited to any specific type of rotationally asymmetric feature. As another example, the end face of a shaft may comprise a circular opening with a notch, similar to old skeleton keyholes. In this example, the tool has a center prong (i.e., a first prong) and a paddle (i.e., a second prong), wherein the center prong extends beyond the paddle. Thus, the tool of this example is shaped as a skeleton key. The center prong aligns the tool with the center of the shaft (and thus the cam of the shaft), and the paddle enables the tool to rotate the shaft.

Figure 12:
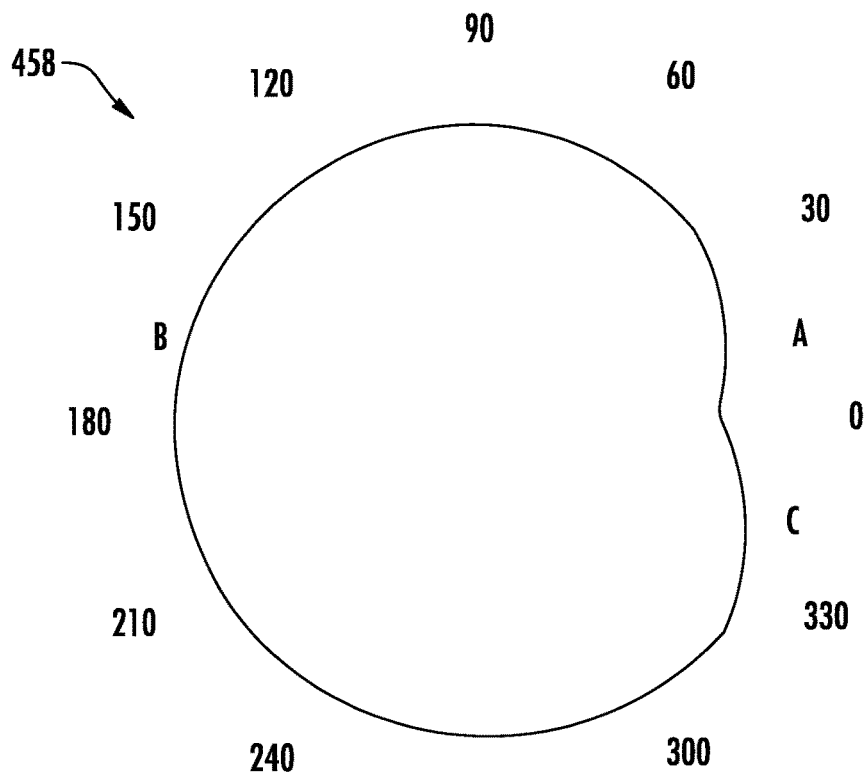
FIG. 12 is a front view of an explanatory cam for positioning on a shaft of a variable ratio coupler.
Figure 13:
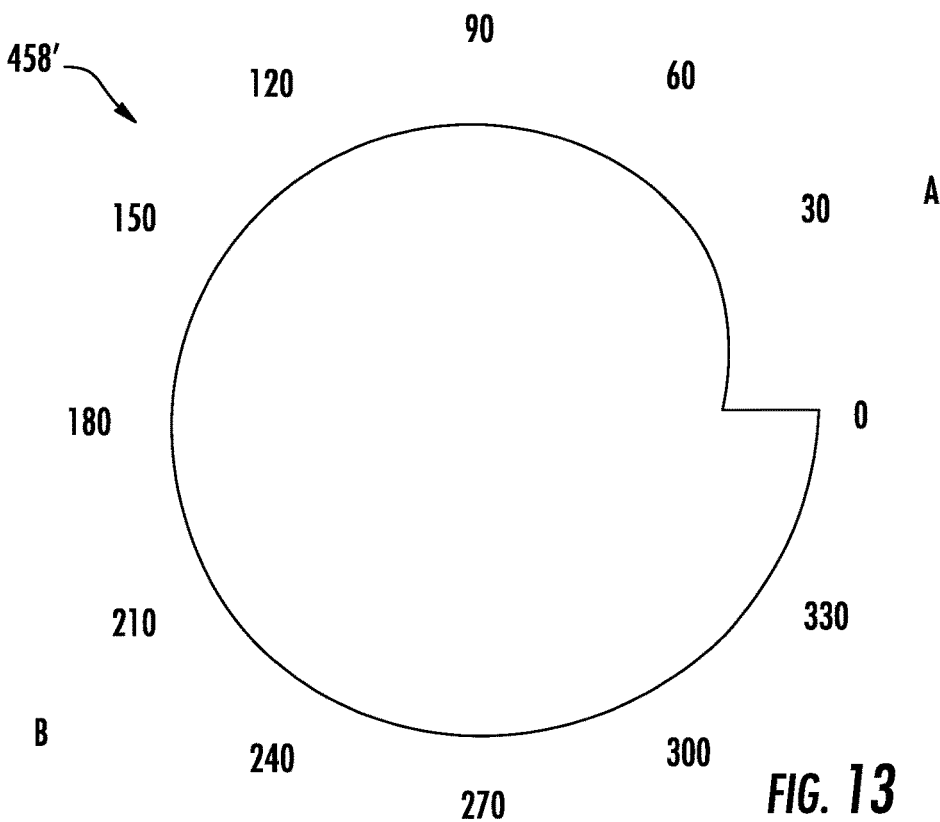
FIG. 13 is a front view of another explanatory cam for positioning on a shaft of a variable ratio coupler.

FIGS. 12 and 13 illustrate two non-limiting example cams 458, 458' provided on a shaft 452. It should be understood that the cam may take on any shape so long as it provides the desired set-points of the VRC, and that embodiments are not limited by any cam shape.

In the design of the cam 458 shown in FIG. 12, the cam profile changes linearly with that of the cam rotation angle and based on the deflection characteristics of couplers. The cam 458 of FIG. 12 has a linearized cam design, which is divided into three zones A, B and C. In each of these zones, the radius changes uniformly but the rate of change and nature of change is different in the three zones. As an example, for a multiclad 1×2 coupler made from similar fibers, the nature of tap change may be given as follows: (1) In zone A, tap changes from 96% to 50% for 40 degrees of cam rotation, (2) in zone B, tap changes from 50% to 2%, and finally (3) in zone C tap changes from 2% to 96% again.

Referring to FIG. 13, the linearized cam is limited to only two zones, A and B. As an example, in zone A, the tap value changes from 96% to 50%, in zone B, the tap value changes from 50% to 2%. The range of rotation in zone A is 40 degrees whereas that in zone B is 320 degrees. For this cam profile, the initial 0 to 40 degrees of the cam rotation (denoted as zone A), is used to bring the tap to 50% from the initial value of 96%. As the primary objective of the VRC is to change the tap in the range of 50% to 2%, maximum angular space for cam rotation is dedicated to this tap range. The shaft 452 does not need to rotate a full 360 degrees and hence a stop may be put at the very end of the zone of the cam profile, which allows 50% to 2% tap change, over 40 degrees to 360 degrees of cam rotation (denoted by zone B), providing a total range of 320 degrees for the useful tap range. As described above, the two linearized cam designs of FIGS. 12 and 13 enable the useful range of tap change from 50% to 2% over a cam rotation angle range of 280 to 320 degrees for the oversized eccentric cams 458 and 458', respectively. This will in turn also improve the resolution of the tap states, given by the inter detent distance on the set-point portion 453 shown in FIG. 9. It should also be noted that the cam does not need to have zone A, whose main function is to bring the undeflected coupler to 50% tap which is the starting point of the operating regime. Instead, the entire arc space may be devoted to zone B to expand the resolution and maximize inter tap distances for drilled holes and dial indicators. Following the linearized cam designs described above, the cam profile can be constructed such that the resulting holes for the detents corresponding to the different tap states/split ratios are substantially equally spaced. This enables the plurality of set-point markers 408 to be evenly spaced, such as shown in FIG. 8.

In some embodiments, more information is encoded mechanically in the depth of the rotationally asymmetric feature drilled or otherwise provided in the end face 454 of the shaft 452. This depth can be varied gradually or in discrete increments, for example, according to the spacing of the detents 455 in the particular VRC. To avoid unbalanced forces when the tool 400 engages with the shaft 452, one option may be to use a centered hole of the rotationally asymmetric feature for the depth information. It is possible to decouple the longitudinal positions of the different parts of the tool 400 that engage with holes in the end face 454 (e.g., prongs 560 as shown in FIG. 14 below), for example, by using co-axial elements that can slide over each other.

If the axle 402 of the tool 400 is biased (e.g., spring-loaded) or otherwise pushed into the hole(s) of the end face 454 until it reaches the bottom of the hole(s), the axle 402 will be in a longitudinal position that depends on the insertion depth. This feature may be exploited to match the tool labeling to the detent positions more accurately than with just the azimuthal orientation of the tool 400.

Figure 14:
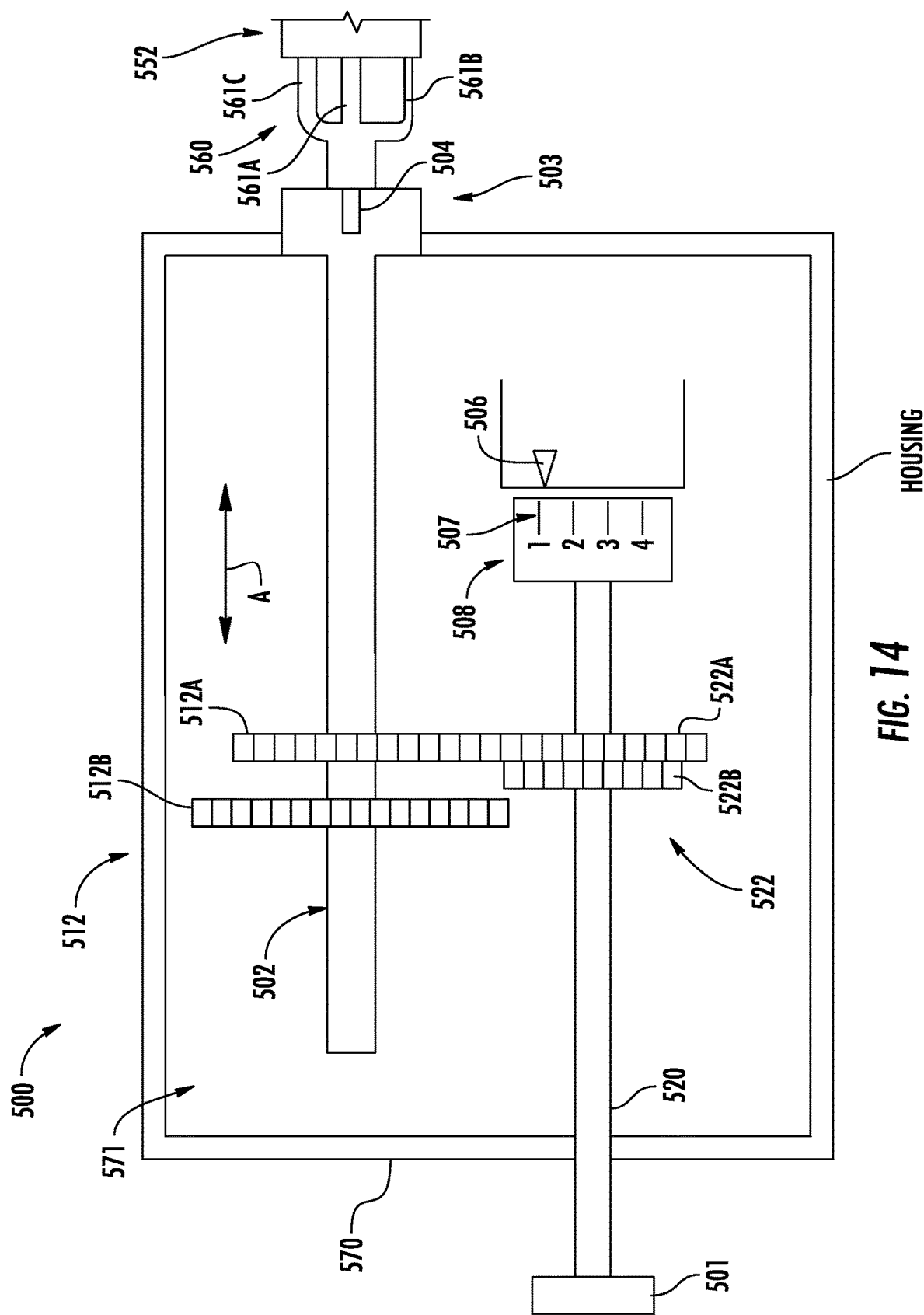
FIG. 14 is a top schematic view of another explanatory tool for changing an output power level between a first optical output and a second optical output that employs a gear box.

Referring now to FIG. 14, a non-limiting example tool 500 that utilizes insertion depth is illustrated. In this example, a "gear box" is used to give two or more different rotation rates of the tool axle for a given rotation of a second axle that carries the indicator labels, as described in more detail below.

The tool 500 includes a housing 570 defining a cavity 571 in which interior components are disposed. The tool 500 further includes a terminal engagement member 503 that is rigidly coupled to the housing 570 or is integral with the housing itself (i.e., a part of the housing 570). The terminal engagement member 503 includes a terminal engagement feature 504 that functions as described above with respect to the terminal engagement body 403 and terminal engagement feature 404 of FIG. 8.

The tool 500 further includes an input axle 520 partially disposed within the cavity 571 and that extends out of the housing for user access. An end piece, which is configured as a knob 501 is provided on an end of the input axle 520. The knob 501 enables a user to turn the input axle 520. An indicator body 508 is rigidly coupled to an end of the input axle 520. The indicator body 508 includes a plurality of set-point markers 507 that are visible through the housing 570. In an example, the housing 570 may include a window or an opening (not shown) so that the plurality of set-point markers 507 are visible. As a further example, the window may include a lens so that the plurality of set-point markers 507 are magnified and more visible to the user.

A set-point indicator 506 is provided on housing 570, or on some component that is rigidly coupled to the housing 570. In the illustrated embodiment, the set-point indicator 506 is configured as an arrow; however, embodiments are not limited thereto.

A first set of gears 522 is disposed on the input axle. In the non-limiting example of FIG. 14, the first set of gears 522 includes a first gear 522A and a second gear 522B having different diameters. Rotation of the input axle 520 causes rotation of the first set of gears 522.

The tool 500 further includes an adjustment axle 502 partially disposed within the cavity 571 and partially extending out of the housing 570 and cavity 571. The adjustment axle 502 is free to rotate with respect to the housing 570 and the terminal engagement member 503, as well as linearly translate along direction A. The adjustment axle 502 has an adjustment end having a rotationally asymmetric feature 560 configured to mate with the rotationally asymmetric feature (not shown in FIG. 14 but see FIG. 10) of a shaft 552 of a terminal. In the illustrated embodiment the rotationally asymmetric feature 560 is provided by a first prong 561A, a second prong 561B, and a third prong 561C. A depth of insertion of the adjustment axle 502 into the shaft 552 may depend on the length of one or more of the first prong 561A, the second prong 561B, and the third prong 561C and the depth of one or more of the corresponding holes on the shaft 552.

A second set of gears 512 is disposed on the adjustment axle 502 such that the second set of gears 512 rotates when the adjustment axle 502 rotates. In the non-limiting example of FIG. 14, the second set of gears 512 includes a first gear 512A and a second gear 512B having different diameters.

When the user mates the tool 500 to the terminal, the terminal engagement feature 504 may engage an alignment feature of the terminal. For example, the terminal engagement member 503 may be disposed within a control port (not shown in FIG. 14) such that the terminal engagement feature 504 mates with an alignment feature 213 within the control port 260CTL as described above and shown in FIG. 4, for example. The adjustment axle 502 is also partially inserted into the control port. The adjustment end 560 of the adjustment axle 502 is inserted into the shaft 552 at an insertion depth. The insertion depth dictates a lateral movement and position of the adjustment axle 502. At a shallow first insertion depth, the adjustment axle 502 is at a first position such that the first gear 512A of the second set of gears 512 engages the first gear 522A of the first set of gears 522. The user may rotate the knob 501 to rotate the input axle 520 and the first set of gears 522 and the indicator body 508. Rotation of the first gear 522A of the first set of gears 522 causes rotation of the first gear 512A of the second set of gears 512 and the adjustment axle 502. Rotation of the adjustment axle 502 causes rotation of the shaft 552 to the desired detent and set-point. Rotation of the adjustment axle 502 is provided at a first rotation rate due to the gear ratio provided by the first gears 512A, 522A.

At a deep, second insertion depth, the adjustment axle 502 is at a second position such that the second gear 512B of the second set of gears 512 engages the second gear 522B of the first set of gears 522. Rotation of the knob 501 causes rotation of the adjustment axle 502 at a second rotation rate due to the gear ratio provided by the second gears 512B, 522B.

In the embodiment of FIG. 14, the reference angular position should be maintained between the two axles so that the zero point is the same for all gear sets. One solution is to have a zeroing step, such as before the tool is inserted, where the input axle is rotated to a defined position and the adjustment axle is released from its gearing to the input axle and rotated to its own defined position.

Figure 15:
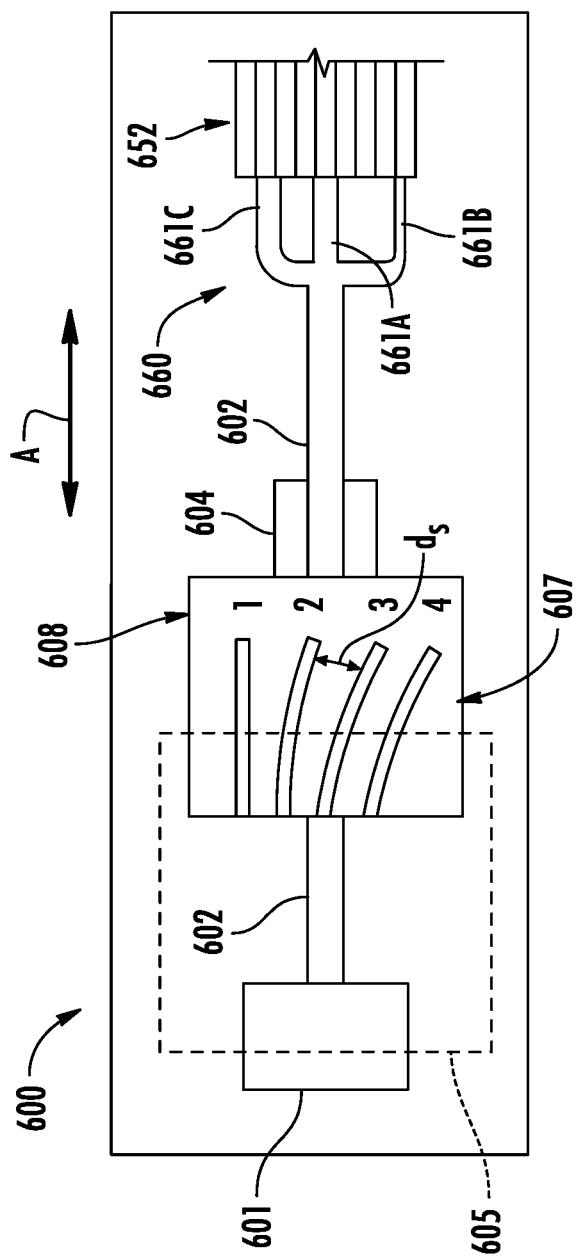
FIGS. 15 and 16 are top schematic views of another explanatory tool for changing an output power level between a first optical output and a second optical output that employs a variable adjustment ratio.
Figure 16:
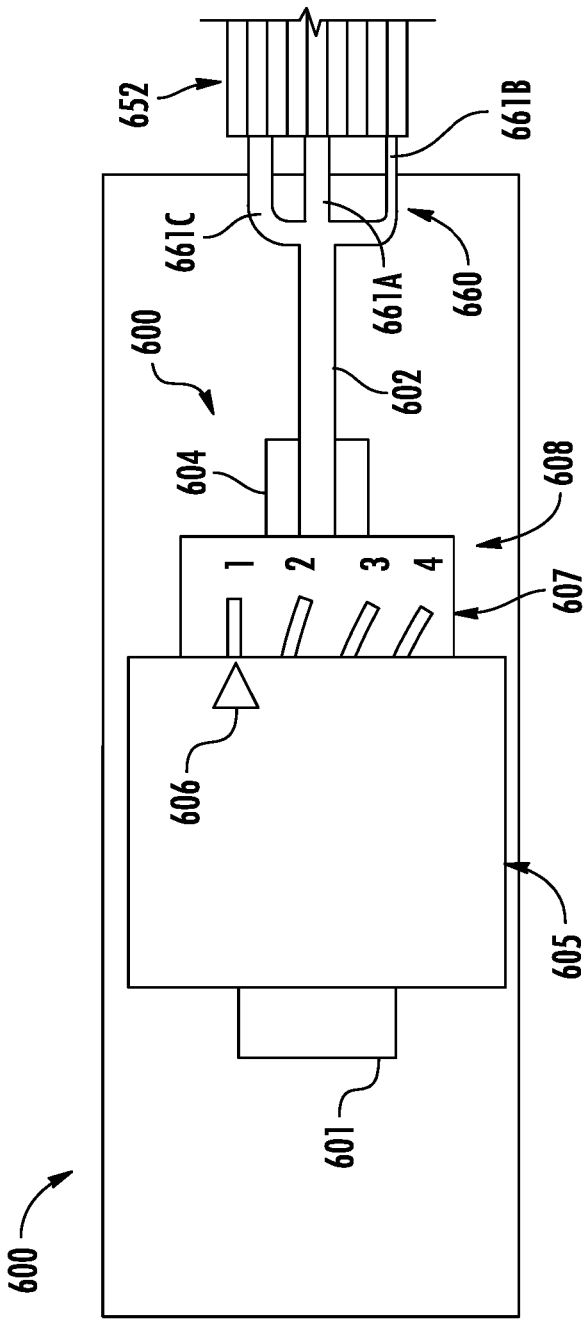

Insertion depth may also be used in other ways, for example, by changing the scale of the set point markers 507. FIGS. 15 and 16 illustrate another tool 600 that uses insertion depth of the tool 600 into a shaft 652 of a terminal (not shown in FIGS. 15 and 16) to change the scale of split ratio adjustment. The example tool 600 generally comprises an axle 602 having an end with a rotationally asymmetric feature 660 which, in the illustrated embodiment, is configured as a first prong 661A, a second prong 661B, and a third prong 661C. The rotationally asymmetric feature 660 is configured to be inserted into the shaft 652 over a range of depths depending on the depth of one or more holes in the shaft.

The tool 600 further comprises an end piece configured as a knob 601 that is coupled to an end of the axle 602, a terminal engagement body 605 having a set-point indicator 606, and an indicator body 608 comprising a plurality of set-point markers 607. FIG. 15 shows the terminal engagement body 605 in shadow lines while FIG. 16 shows the terminal engagement body 605 in solid lines. In some embodiments, the indicator body 608 is rigidly coupled to the axle 602 such that it rotates along with the axle 602. The axle 602 and the indicator body 608 are free to rotate with respect to the terminal engagement body 605. Further the axle 602 and the indicator body 608 are free to laterally translate along longitudinal direction as indicated by arrow A.

The terminal engagement body 605 is configured to engage the terminal such that it is referenced to the terminal. A terminal engagement feature 604 may be provided on the terminal engagement body 605 to engage a corresponding feature on the terminal (not shown). For example the terminal engagement feature 604 may extend past the edge of the indicator body 608 so that it may be inserted into a control port and engage an alignment feature, such as an alignment feature 213 as shown in FIG. 4. In other embodiments, the indicator body 608 is referenced to the terminal and the terminal engagement body 605 is free to rotate with respect to the indicator body 608.

As shown in FIGS. 15 and 16, a separation distance $d_s$ between the lines of the plurality of set-point markers 607 monotonically changes from one end of the indicator body 608 to the other. In the illustrated embodiment, the separation distance $d_s$ increases in a direction away from the knob 601. Thus, the different separation distances $d_s$ provide for different scales of adjustment of the split ratio of the terminal to be displayed. It should be understood that in other embodiments the separation distances $d_s$ decrease with insertion depth. The desired scale of adjustment is set by manufacturing a depth of the hole(s) in the shaft 652. In this manner, the same tool may be used to adjust the split ratio of terminals having different scales of adjustment.

In use, the user will insert the axle 602 into the control port of a terminal such that the rotationally asymmetric feature 660 is inserted into the shaft 652 of the terminal, and the terminal engagement feature 604 engages a corresponding alignment feature of the terminal. The axle 602 and the indicator body 608 slide forward with respect to the terminal engagement body 605. An amount of movement of the axle 602 and the indicator body 608 relative to the terminal engagement body 605 is dictated by an insertion depth of the axle 602 into the shaft 652. Movement of the axle 602 and the indicator body 608 along the direction of arrow A causes the plurality of set-point markers 607 to be exposed. The deeper the insertion depth, the more of the lines of the plurality of set-point markers 607 are exposed. In the illustrated example, the deeper the insertion depth, the smaller the separation distance $d_s$. A smaller insertion depth (i.e., a shaft with shallow hole(s) for receiving the axle 602) encodes the fact that it takes more rotation of the tool 600 to go from one set-point to another than a shaft with a larger insertion depth (i.e., a shaft with deep hole(s) for receiving the axle 602). The depth of the hole that receives the axle of axle component capable of moving along axis A will be determined from the positions of the detent set, and the hole machined into the end face of the shaft after these positions have been found.

In other embodiments, the indicator body 608 may remain completely beneath the terminal engagement body 605. In such embodiments, the terminal engagement body 605 may include an opening or a window (e.g., a slit) through which the lines of the plurality of set-point markers 607 are visible. The window may have a magnifying lens for magnification, for example.

Figure 17:
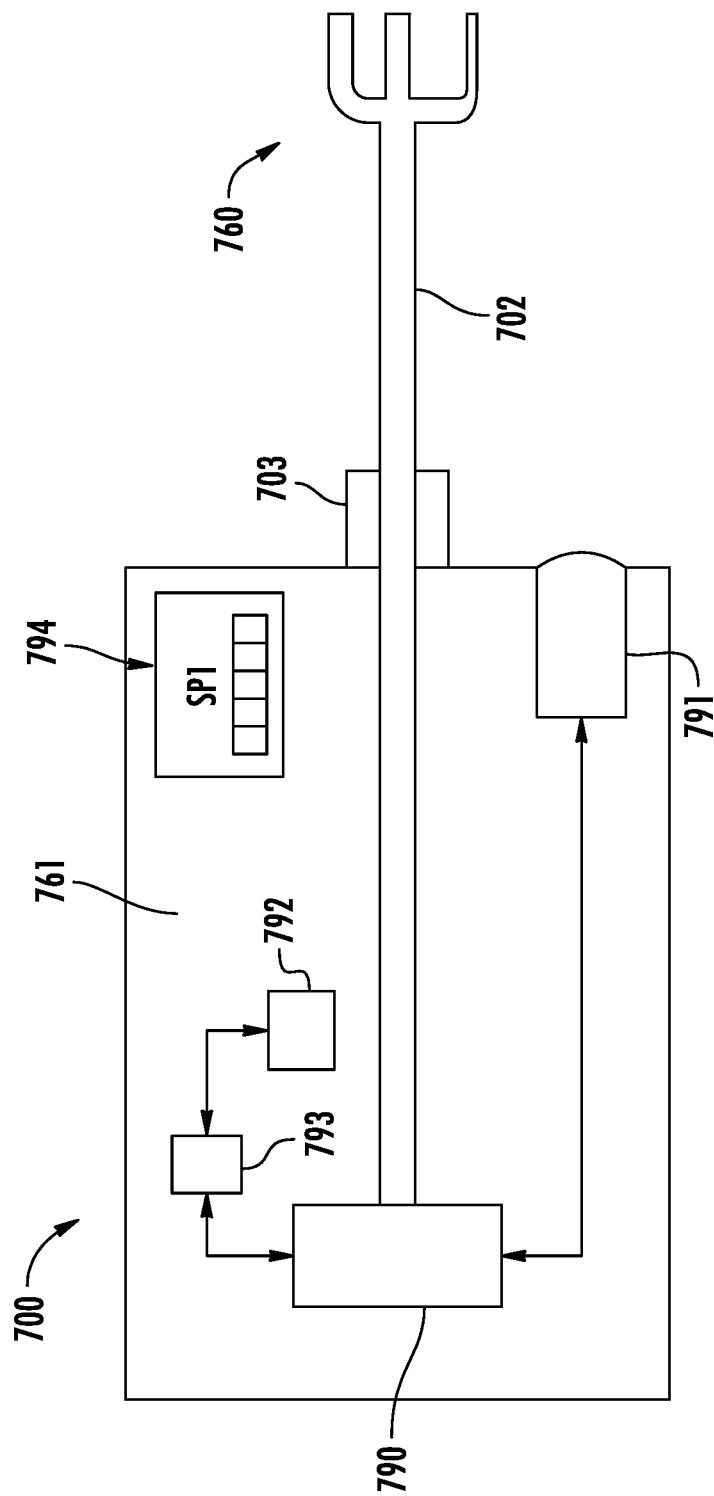
FIG. 17 is a top schematic view of another explanatory tool for automatically changing an output power level between a first optical output and a second optical output using an actuator.

Referring now to FIG. 17, an example automated tool 700 for adjusting a split ratio of a fiber optic terminal is illustrated. The automated tool 700 does not require a user to physically turn the axle to make the split ratio adjustment. Rather, an actuator 790, such as a small motor, performs the adjustment automatically.

The tool 700 generally comprises an axle 702 having a rotationally asymmetric feature 760 and an actuator 790 configured to rotate the axle 702. The axle 702 and the actuator 790 are disposed within a housing 761 such that the axle 702 extends outside of the house 761 so that it may be inserted into a control port of a terminal. The housing 761 may include a terminal engagement body 703 or feature for referencing the tool 700 to a terminal, as described above.

Calibration information for the VRC of the terminal to which the tool 700 will be mated is obtained by the tool 700. The calibration information includes at least information relating to the locations of the set-points provided by the detents positioned on the shaft of the VRC. During fabrication of the VRC, the precise locations of the set-point (i.e., the detents) may be recorded and then later provided to the tool 700. In some embodiments, the tool 700 includes a read-out display and an input control 794 that a user may utilize to determine which set-point the terminal is presently set at, and to input a desired set-point. The tool 700 further includes an encoder or some other device that provides feedback by a position signal regarding an angular position of the axle 702. The encoder may be incorporated into the actuator 790, for example. During operation, the user may input a desired set-point. The tool 700 is programmed (e.g, using a controller 793 and instructions stored on non-transitory computer readable memory) to determine the current angular position of the axle 702, to determine the angular position of the desired set-point from the calibration information, and then rotate the axle 702 to tune the shaft of the VRC to the precise location of the desired set-point. A controller 793 may provide a control signal to the actuator 790 such that the actuator 790 moves to the desired position, for example.

The calibration information may be obtained in a variety of ways. In one example, the tool is equipped with an optical sensor 791 that is capable of scanning a marker, such as a code, on the housing of the terminal, or on the shaft of the VRC. The code may be a color code, a bar code, a matrix code, or a QR code, for example. The tool 700 may then look up the calibration information based on the scanned code. For example, the code may provide a link to a device file stored at a remote server (i.e., the cloud) that provides metadata, calibration data and/or links to instructional data for installation. In another example, the terminal may include an RFID tag that may be interrogated by an RFID scanner of the tool 700 for passing the calibration information, or a reference number that references the calibration information.

The calibration information may be provided in a table stored locally in memory in the tool 700. In another example, a communication module 792 may be configured to communicate with an external network, such as the Internet, to pull the calibration information of the scanned code from a remote server.

In other embodiments, the tool 700 does not include an optical sensor. Rather, a communication module 792 is operable to communicate with a computing device, such as a mobile phone. The user may scan a marker (e.g., a code) using the computing device, and the computing device may pull the calibration information from a remote server via a communication network. In another example, the user may enter the serial number of the terminal, or scan the serial number of the terminal, to retrieve the calibration information from the remote server. The computing device may then transmit the calibration information to the tool 700 by way of the communication module 792.

In some embodiments, the communication module 792 may communicate the current set-point of the terminal to the remote server to facilitate record-keeping.

For the purposes of describing and defining the present invention it is noted that the terms "approximately" and "substantially" are utilized herein to represent the inherent degree of uncertainty that may be attributed to any quantitative comparison, value, measurement, or other representation. The terms "approximately" and "substantially" are also utilized herein to represent the degree by which a quantitative representation may vary from a stated reference without resulting in a change in the basic function of the subject matter at issue.

It is noted that recitations herein of a component of the present invention being "configured" in a particular way, "configured" to embody a particular property, or function in a particular manner, are structural recitations as opposed to recitations of intended use. More specifically, the references herein to the manner in which a component is "configured" denotes an existing physical condition of the component and, as such, is to be taken as a definite recitation of the structural characteristics of the component.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

Although the disclosure has been illustrated and described herein with reference to explanatory embodiments and specific examples thereof, it will be readily apparent to those of ordinary skill in the art that other embodiments and examples can perform similar functions and/or achieve like results. For instance, the connection port insert may be configured as individual sleeves that are inserted into a passageway of a device, thereby allowing the selection of different configurations of connector ports for a device to tailor the device to the desired external connector. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

The invention claimed is:

1. A fiber optic terminal comprising:
a shell comprising a cavity;
a plurality of ports comprising a control port having a port opening extending from an outer surface of the terminal into the cavity and defining a port passageway along a longitudinal axis, wherein the control port is operable to receive a tool; and
a variable ratio coupler disposed within the cavity, the variable ratio coupler comprising an optical input, a first optical output, a second optical output, and a shaft, wherein rotation of the shaft by the tool changes an output power level between the first optical output and the second optical output at a coupling region.

2. A fiber optic terminal according to claim 1, wherein the plurality of ports further comprises:
   at least one input connection port; and
   a pass-through output connection port.

3. A fiber optic terminal according to claim 1, wherein the shaft comprises an end face, and the end face further comprises one or more features such that the end face is rotationally asymmetric with respect to the tool.

4. A fiber optic terminal according to claim 3, wherein the end face further comprises a first hole for receiving a first prong of the tool and a second hole for receiving a second prong of the tool, and the first hole and the second hole are asymmetrically arranged on the end face of the shaft.

5. A fiber optic terminal according to claim 1, wherein the shaft comprises a plurality of detents circumferentially arranged on a surface of the shaft, and the plurality of detents correspond to a plurality of set-points for the output power level between the first optical output and the second optical output.

6. A fiber optic terminal according to claim 5, wherein:
   the variable ratio coupler further comprises:
      a cam positioned on a portion of the shaft; and
      a flexure comprising a first end that contacts a portion of the cam and a second end that is held immobile in the variable ratio coupler; and
      a coupler, wherein each end of the coupler is mounted to a different end of the flexure;
   rotation of the shaft causes the cam to change an amount of bend on the coupling region thereby changing the output power level between the first optical output and the second optical output at the coupling region.

7. A fiber optic terminal according to claim 6, wherein rotation of the cam changes an amount of deflection on the first end of the flexure which also changes an amount of deflection on the coupling region.

8. A fiber optic terminal according to claim 6, wherein a shape of the cam is such that the flexure changes the amount of bend on the coupling region for a desired power level between the first optical output and the second optical output when the plunger is positioned within a desired detent of the plurality of detents and provides for substantially equally spaced set-point indicators on the tool.

9. A fiber optic terminal according to claim 1, wherein the plurality of ports are provided in an array at an end face of the shell.

10. A method of changing a split ratio of a fiber optic terminal, the method comprising:
   inserting an axle of a tool into a control port passageway of a control port of a plurality of ports of the fiber optic terminal to engage an end of the axle with a shaft of a variable ratio coupler within a cavity of the fiber optic terminal; and
   rotating the axle of the tool to rotate the shaft of the variable ratio coupler to a desired set-point, wherein the desired set-point corresponds to a desired output power level between a first optical output and a second optical output of the variable ratio coupler.

11. A method according to claim 10, wherein the first optical output is provided at a first output connection port of the plurality of ports and the second optical output is provided at a second output connection port of the plurality of ports.

12. A method according to claim 10, wherein the plurality of ports extend from an outer surface of a shell of the fiber optic terminal into the cavity defined by the shell.

13. A method according to claim 12, wherein:
   the shaft comprises a plurality of detents circumferentially arranged on a surface of the shaft, and the plurality of detents correspond to a plurality of set-points for an output power level between the first optical output and the second optical output;
   the desired set-point is an individual one of the plurality of set-points.

14. A method according to claim 13, wherein a resistance to rotate the tool is increased when a plunger is within the individual detent of the plurality of detents.

15. A method according to claim 10, further comprising scanning a marker on the fiber optic terminal to obtain calibration information, wherein rotating the axle of the tool is performed by an actuator within the tool such that the axle stops rotating at the desired set-point automatically based on the calibration information.

16. A method according to claim 15, wherein the scanning of the marker is performed by the tool.

17. A method according to claim 15, wherein the scanning of the marker is performed by a computing device.

* * * * *